US008820928B2

(12) United States Patent
Back et al.

(10) Patent No.: US 8,820,928 B2
(45) Date of Patent: Sep. 2, 2014

(54) SILICONE HYDROGEL CONTACT LENSES

(75) Inventors: Arthur Back, Danville, CA (US); David Robert Morsley, Eastleigh (GB); Richard Rogers, Eastleigh (GB); Sarah Almond, Eastleigh (GB); Charlie Chen, San Ramon, CA (US); Yuwen Liu, Dublin, CA (US); Charles A. Francis, Union City, CA (US); Ye Hong, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 306 days.

(21) Appl. No.: 13/404,033

(22) Filed: Feb. 24, 2012

(65) Prior Publication Data

US 2012/0218509 A1  Aug. 30, 2012

Related U.S. Application Data

(60) Provisional application No. 61/447,161, filed on Feb. 28, 2011.

(51) Int. Cl.
*G02C 7/04* (2006.01)
*C08L 83/04* (2006.01)
*G02B 1/04* (2006.01)
*C08G 77/46* (2006.01)
*C08G 77/20* (2006.01)

(52) U.S. Cl.
CPC ............ *C08L 83/04* (2013.01); *C08G 77/46* (2013.01); *G02B 1/043* (2013.01); *C08G 77/20* (2013.01)
USPC ............ 351/159.73; 351/159.33; 351/159.78

(58) Field of Classification Search
CPC ....... G02C 7/022; G02C 7/024; G02C 13/003
USPC ........................... 351/159.33, 159.73, 159.78
See application file for complete search history.

(56) References Cited

U.S. PATENT DOCUMENTS

| | | | |
|---|---|---|---|
| 2,393,266 A | 1/1946 | Riddell | |
| 2,989,894 A | 6/1961 | Gordon | |
| 3,228,741 A | 1/1966 | Becker | |
| 3,246,941 A | 4/1966 | Moss | |
| 3,431,046 A | 3/1969 | Conrad et al. | |
| 3,594,074 A | 7/1971 | Rosen | |
| 3,907,851 A | 9/1975 | Boersma et al. | |
| 4,099,859 A | 7/1978 | Merrill | |
| 4,121,896 A | 10/1978 | Shepherd | |
| 4,136,250 A | 1/1979 | Mueller et al. | |
| 4,153,641 A | 5/1979 | Deichert et al. | |
| 4,182,822 A | 1/1980 | Chang | |
| 4,208,365 A | 6/1980 | LeFevre | |
| 4,217,038 A | 8/1980 | Letter et al. | |
| 4,246,389 A | 1/1981 | LeBoeuf | |
| 4,259,467 A | 3/1981 | Keogh et al. | |
| 4,260,725 A | 4/1981 | Keogh et al. | |
| 4,293,397 A | 10/1981 | Sato et al. | |
| 4,353,849 A | 10/1982 | Lewison | |
| 4,401,371 A | 8/1983 | Neefe | |
| 4,440,918 A | 4/1984 | Rice et al. | |
| 4,487,905 A | 12/1984 | Mitchell | |
| 4,605,712 A | 8/1986 | Mueller et al. | |
| 4,640,594 A | 2/1987 | Berger | |
| 4,649,184 A | 3/1987 | Yoshikawa et al. | |
| 4,703,097 A | 10/1987 | Wingler et al. | |
| 4,711,943 A | 12/1987 | Harvey, III | |
| 4,879,072 A | 11/1989 | Bourset et al. | |
| 4,890,911 A | 1/1990 | Sulc et al. | |
| 4,921,205 A | 5/1990 | Drew, Jr. et al. | |
| 4,954,586 A | 9/1990 | Toyoshima et al. | |
| 5,009,497 A | 4/1991 | Cohen | |
| 5,010,141 A | 4/1991 | Mueller | |
| 5,023,305 A | 6/1991 | Onozuka et al. | |
| 5,034,461 A | 7/1991 | Lai et al. | |
| 5,070,169 A | 12/1991 | Robertson et al. | |
| 5,079,319 A | 1/1992 | Mueller | |
| 5,104,213 A | 4/1992 | Wolfson | |
| 5,158,717 A | 10/1992 | Lai | |
| 5,166,710 A | 11/1992 | Hofer et al. | |
| 5,258,490 A | 11/1993 | Chang | |
| 5,260,000 A | 11/1993 | Nandu et al. | |
| 5,274,008 A | 12/1993 | Lai | |
| 5,312,690 A | 5/1994 | Fukuda et al. | |

(Continued)

FOREIGN PATENT DOCUMENTS

| | | |
|---|---|---|
| DE | 2546692 | 4/1977 |
| EP | 0330616 A1 | 8/1989 |

(Continued)

OTHER PUBLICATIONS

International Preliminary Report on Patentability issued in corresponding International Patent Application No. PCT/US2012/26212 mailed Feb. 19, 2013 (7 pages).
Written Opinion of the International Preliminary Examining Authority issued in corresponding International Patent Application No. PCT/US2012/26212 mailed May 23, 2013 (6 pages).
International Search Report and Written Opinion issued in corresponding International Patent Application No. PCT/US2012/026212, dated Jun. 8, 2012 (16 pages).
Declaration of Eri Ito dated Mar. 30, 2010 (4 pages).
Suminoe et al., "Study of new non-water containing soft contact lenses, First Report: Basic physical properties of the material," 1983, pp. 100-104 (in Japanese with English translation attached) (18 pages).
Communication of a notice of opposition for European Patent Application No. 00981765.1 issued by the European Patent Office dated Jun. 2, 2010 (1 page).

(Continued)

*Primary Examiner* — Jordan Schwartz
(74) *Attorney, Agent, or Firm* — Kilyk & Bowersox, P.L.L.C.

(57) ABSTRACT

Silicone hydrogel contact lenses are produced without using volatile organic solvents to extract materials from the polymerized contact lens bodies, and instead are washed with aqueous liquids. The silicone hydrogel contact lenses so produced have ophthalmically wettable lens surfaces such that less than five percent of a batch of twenty or more such silicone hydrogel contact lenses have visually identifiable non-wetting spots when the contact lenses are located on eyes of subjects.

40 Claims, No Drawings

(56) References Cited

U.S. PATENT DOCUMENTS

| | | | |
|---|---|---|---|
| 5,314,960 A | 5/1994 | Spinelli et al. |
| 5,321,108 A | 6/1994 | Kunzler et al. |
| 5,347,326 A | 9/1994 | Volk |
| 5,352,714 A | 10/1994 | Lai et al. |
| 5,358,995 A | 10/1994 | Lai et al. |
| 5,387,632 A | 2/1995 | Lai et al. |
| 5,451,617 A | 9/1995 | Lai et al. |
| 5,483,304 A | 1/1996 | Porat |
| 5,486,579 A | 1/1996 | Lai et al. |
| 5,496,871 A | 3/1996 | Lai et al. |
| 5,539,016 A | 7/1996 | Kunzler et al. |
| 5,598,233 A | 1/1997 | Haralambopoulos et al. |
| 5,641,437 A | 6/1997 | Williams et al. |
| 5,712,327 A | 1/1998 | Chang et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,807,944 A | 9/1998 | Hirt et al. |
| 5,817,924 A | 10/1998 | Tuomela et al. |
| 5,849,811 A | 12/1998 | Nicolson et al. |
| 5,945,498 A | 8/1999 | Hopken et al. |
| 5,959,117 A | 9/1999 | Ozark et al. |
| 5,962,548 A | 10/1999 | Vanderlaan et al. |
| 5,965,631 A | 10/1999 | Nicolson et al. |
| 5,969,076 A | 10/1999 | Lai et al. |
| 5,981,675 A | 11/1999 | Valint, Jr. et al. |
| 5,998,498 A | 12/1999 | Vanderlaan et al. |
| 6,019,472 A | 2/2000 | Koester et al. |
| 6,020,445 A | 2/2000 | Vanderlaan et al. |
| 6,043,328 A | 3/2000 | Domschke et al. |
| 6,310,116 B1 | 10/2001 | Yasuda et al. |
| 6,359,024 B2 | 3/2002 | Lai |
| 6,367,929 B1 | 4/2002 | Maiden et al. |
| 6,436,481 B1 | 8/2002 | Chabrecek et al. |
| 6,638,991 B2 | 10/2003 | Baba et al. |
| 6,649,742 B1 | 11/2003 | Better et al. |
| 6,652,095 B2 | 11/2003 | Tung |
| 6,689,480 B2 | 2/2004 | Shimoyama et al. |
| 6,727,336 B1 | 4/2004 | Ito et al. |
| 6,779,888 B2 | 8/2004 | Marmo |
| 6,849,671 B2 | 2/2005 | Steffen et al. |
| 6,861,123 B2 | 3/2005 | Turner et al. |
| 6,867,245 B2 | 3/2005 | Iwata et al. |
| 6,886,936 B2 | 5/2005 | Marmo et al. |
| 6,891,010 B2 | 5/2005 | Kunzler et al. |
| 6,902,812 B2 | 6/2005 | Valint, Jr. et al. |
| 6,921,802 B2 | 7/2005 | Kunzler et al. |
| 6,940,580 B2 | 9/2005 | Winterton et al. |
| 6,943,203 B2 | 9/2005 | Vanderlaan et al. |
| 6,951,894 B1 | 10/2005 | Nicolson et al. |
| 6,992,118 B2 | 1/2006 | Sulc et al. |
| 7,426,993 B2 | 9/2008 | Coldrey et al. |
| 7,540,609 B2 | 6/2009 | Chen et al. |
| 7,572,841 B2 | 8/2009 | Chen et al. |
| 7,934,830 B2 | 5/2011 | Blackwell et al. |
| 8,231,218 B2 * | 7/2012 | Hong et al. ............ 351/159.02 |
| 2002/0016383 A1 | 2/2002 | Iwata et al. |
| 2002/0107324 A1 | 8/2002 | Vanderlaan et al. |
| 2002/0120084 A1 | 8/2002 | Valint, Jr. et al. |
| 2002/0137811 A1 | 9/2002 | Turek et al. |
| 2003/0008154 A1 | 1/2003 | Aguado et al. |
| 2003/0039748 A1 | 2/2003 | Valint, Jr. et al. |
| 2003/0095232 A1 | 5/2003 | Mitsui |
| 2003/0109390 A1 | 6/2003 | Salpekar et al. |
| 2003/0109637 A1 | 6/2003 | Kunzler et al. |
| 2003/0125498 A1 | 7/2003 | McCabe et al. |
| 2003/0134132 A1 | 7/2003 | Winterton et al. |
| 2003/0162862 A1 | 8/2003 | McCabe et al. |
| 2004/0039077 A1 | 2/2004 | Baba et al. |
| 2005/0053642 A1 | 3/2005 | Ulbricht et al. |
| 2005/0154080 A1 | 7/2005 | McCabe et al. |
| 2005/0165187 A1 | 7/2005 | Kunzler et al. |
| 2005/0179862 A1 | 8/2005 | Steffen et al. |
| 2005/0228065 A1 | 10/2005 | Nicolson et al. |
| 2006/0001184 A1 | 1/2006 | Phelan et al. |
| 2006/0007391 A1 | 1/2006 | McCabe et al. |
| 2006/0012751 A1 | 1/2006 | Rosenzweig et al. |
| 2006/0063852 A1 | 3/2006 | Iwata et al. |
| 2006/0072069 A1 | 4/2006 | Laredo et al. |
| 2006/0074208 A1 | 4/2006 | Laredo |
| 2007/0066706 A1 | 3/2007 | Manesis et al. |
| 2007/0104611 A1 | 5/2007 | Marmo et al. |
| 2007/0231292 A1 | 10/2007 | Vanderlaan et al. |
| 2007/0291223 A1 | 12/2007 | Chen et al. |
| 2007/0296914 A1 | 12/2007 | Hong et al. |
| 2008/0048350 A1 | 2/2008 | Chen et al. |
| 2008/0067702 A1 | 3/2008 | Yao et al. |
| 2009/0018233 A1 | 1/2009 | Nunez et al. |
| 2009/0234089 A1 | 9/2009 | Ueyama et al. |
| 2009/0299022 A1 | 12/2009 | Ichinohe |
| 2010/0084775 A1 | 4/2010 | McCabe et al. |
| 2010/0201009 A1 | 8/2010 | Bruce et al. |
| 2011/0009587 A1 | 1/2011 | Awasthi et al. |
| 2012/0026458 A1 * | 2/2012 | Qiu et al. ............ 351/160 H |

FOREIGN PATENT DOCUMENTS

| | | |
|---|---|---|
| EP | 0330617 A1 | 8/1989 |
| EP | 0908476 A2 | 4/1999 |
| EP | 0908744 A1 | 4/1999 |
| EP | 1870736 A1 | 12/2007 |
| GB | 1399301 | 7/1975 |
| JP | 54-081363 | 5/1979 |
| JP | 63-297411 | 12/1988 |
| JP | 64-084219 | 3/1989 |
| JP | 05-019214 | 1/1993 |
| JP | 06-170857 | 6/1994 |
| JP | 08-025378 | 1/1996 |
| JP | 08-245737 | 9/1996 |
| JP | 08-245790 | 9/1996 |
| JP | 08-304746 | 11/1996 |
| JP | 11-320699 | 11/1999 |
| WO | 91-04283 A1 | 4/1991 |
| WO | 93-05085 A1 | 3/1993 |
| WO | 2009-009527 A1 | 1/2009 |
| WO | 2011-037893 A2 | 3/2011 |
| WO | 2011-041523 A2 | 4/2011 |

OTHER PUBLICATIONS

John Wiley & Sons, Inc., "Polyesters, Films," Encyclopedia of Polymer Science and Engineering, vol. 12, pp. 193-200, 217, and 225-229 (17 pages) 1988.

Holden et al., "Critical,Oxygen Levels to Avoid Corneal Edema for Daily and Extended Wear Contact Lenses," Investigative Ophthalmology & Visual Science, vol. 25, Oct. 1984, pp. 1161-1167 (7 pages).

Terry et al., "CCLRU Standards for Success of Daily and Extended Wear Contact Lenses," Optometry and Vision Science, vol. 70, No. 3, pp. 234-243 (10 pages) (copyright 1993 American Academy of Optometry).

Jones et al., "Silicone hydrogel contact lenses Part 1 Evolution and current status," www.optometry.co.uk, pp. 26-32, Sep. 20, 2002 (7 pages).

Grant et al., "The Oxygen Transmissibility Profile of Siloxane Hydrogel Contact Lenses," (Poster presentation obtained from the Internet in Oct. 2005. Applicant is unaware of the publication date of the poster, but according to document properties of the electronic poster, it was created and last modified in 2002) (3 pages).

Steffen et al., "Finding the Comfort Zone With the Newest Silicone Hydrogel Technology," Contact Lens Spectrum (obtained from the internet in Oct. 2005; applicant is unaware of the publication date) (5 pages).

Nicolson et al., "Soft contact lens polymers: an evolution," Biomaterials, No. 22, 2001, pp. 3273-3283 (11 pages).

Bausch & Lomb (R) PureVision (TM) Contact Lenses (product information page dated Apr. 21, 1999) (1 page).

Grobe III, et al., "Surface chemical structure for soft contact lenses as a function of polymer processing," Journal of Biomedical Materials Research, vol. 32, 1996, pp. 45-54 (10 pages).

* cited by examiner

SILICONE HYDROGEL CONTACT LENSES

This application claims the benefit under 35 U.S.C. §119 (e) of prior U.S. Provisional Patent Application No. 61/447,161, filed Feb. 28, 2011, which is incorporated in its entirety by reference herein.

FIELD

The present disclosure is directed to silicone hydrogel contact lenses and related compositions and methods.

BACKGROUND

Commercially and clinically, silicone hydrogel contact lenses are a popular alternative to conventional hydrogel contact lenses (i.e., hydrogel contact lenses that do not contain silicone or silicone-containing ingredients). The presence of hydrophobic ingredients, such as siloxanes and other hydrophobic reactive ingredients, in silicone hydrogel contact lens formulations is believed to contribute, at least in part, to the frequent occurrence of clinically ophthalmically unacceptable surface wettabilities associated with the development of new silicone hydrogel contact lenses. For example, a silicone hydrogel contact lens can be determined to have a clinically ophthalmically unacceptable surface wettability if visually identifiable (identifiable under magnification) "non-wetting spots" are observed on a lens surface by an eye care practitioner using conventional techniques, such as slit lamp examinations. A non-wetting spot appears as a discontinuity or disruption in the lens wearer's pre-lens tear film present on the anterior surface of the silicone hydrogel contact lens provided on the eye. A non-wetting spot differs from a dry spot in that a non-wetting spot is a spot on a surface of the contact lens that does not become covered with tear film, even after the lens wearer blinks. In contrast, a dry spot as understood in the art, is a spot on a surface of the contact lens that is covered with pre-lens tear film after a blink and where the pre-lens tear film is disrupted or broken after an amount of time. It is believed that non-wetting spots may be attributed to increased amounts of hydrophobic lens material, such as siloxanes, present at the location of the non-wetting spots, compared to other regions of the lens surface that are wettable with pre-lens tear film.

The commercial manufacture of silicone hydrogel contact lenses frequently includes one or more washing steps using volatile organic solvents, such as alcohol, to remove unreacted or partially reacted chemicals, especially hydrophobic chemical ingredients, from the polymerized lens bodies prior to packaging. This is frequently referred to as an extraction process to remove extractable material from the polymerized silicone hydrogel contact lens product. Following extraction the lens is then rinsed and hydrated using an aqueous solution. The use of volatile organic solvents facilitates removal of a component of the polymerized silicone hydrogel contact lens that has poor solubility in aqueous solutions or water. However, the use of volatile organic solvents presents safety risks to contact lens manufacturing sites, and can be associated with increased costs of goods.

In addition to extracting with volatile organic solvents, a variety of additional manufacturing techniques have been employed to make silicone hydrogel contact lenses having clinically ophthalmically compatible lens surfaces. For example, some silicone hydrogel contact lenses are treated with plasma to form a hydrophilic lens surface; some silicone hydrogel contact lenses are formed from a polymerizable lens formulation containing a hydrophilic polymeric internal wetting agent, such as polyvinyl pyrrolidone (PVP); some silicone hydrogel contact lenses are formed using polar resin contact lens molds instead of non-polar resin contact lens molds, and the lenses do not contain a hydrophilic polymeric internal wetting agent in the polymerizable lens formulation, and are not subject to plasma treatment; and some silicone hydrogel contact lenses are formed in non-polar resin molds and are provided with ophthalmically compatible lens surfaces based on chemical reactivity properties of the chemicals in the polymerizable lens formulation.

Recently silicone hydrogel contact lenses have been produced and prescribed as daily disposable contact lenses (e.g., the 1-DAY ACUVUE TRUEYE (launched in the United Kingdom in 2008) and CLARITI 1-DAY (launched in the United Kingdom in November 2009); both apparently available in Europe. The lens material for 1-DAY ACUVUE TRUEYE contact lenses has a US Adopted Name (USAN) of Narafilcon A, and now more recently, Narafilcon B. The lens material for CLARITI 1-DAY contact lenses has a USAN of Filcon II 3. It has been published that the TRUEYE (Narafilcon A) contact lenses have a water content of 54%, an oxygen permeability (at −3.00 D, center, non-edge corrected) of 100 Dk; an oxygen transmissibility ($10^{-9}$ at −3.00 D) of 118 Dk/t, a modulus of 0.66 MPa, and are associated with a wetting agent/process. It has been published that the CLARITI 1-DAY contact lenses have a water content of 56%, an oxygen permeability (at −3.00 D, center, non-edge corrected) of 60 Dk; an oxygen transmissibility ($10^{-9}$ at −3.00 D) of 86 Dk/t, a modulus of 0.50 MPa, and are associated with a wetting agent/process.

As understood in the industry, a daily disposable contact lens is a contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is between eight and fourteen hours, and they are not cleaned or exposed to cleaning solutions prior to placement in the eye since they are sterile prior to opening the package and then disposed. Thus, a daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye.

In addition to modality differences, the manufacture of daily disposable contact lenses can require changes in chemicals used to make the lenses, changes in manufacturing processes, or both, compared to non-daily disposable contact lenses in order to produce a commercially acceptable number of lenses in a cost-effective manner.

Based on the popularity of silicone hydrogel contact lenses, there continues to be a need for new silicone hydrogel contact lenses that are ophthalmically compatible.

Some documents describing silicone hydrogel contact lenses include: U.S. Pat. No. 4,711,943, U.S. Pat. No. 5,712,327, U.S. Pat. No. 5,760,100, U.S. Pat. No. 7,825,170, U.S. Pat. No. 6,867,245, US20060063852, US20070296914, U.S. Pat. No. 7,572,841, US20090299022, US20090234089, and US20100249356, each of which is incorporated in its entirety by reference herein.

SUMMARY

It has been realized that reducing or eliminating organic solvent based extraction steps in the manufacture of silicone hydrogel contact lenses provides at least one opportunity to reduce costs associated with the manufacture of daily disposable silicone hydrogel contact lenses. However, by replacing organic solvent based extraction steps, such as extracting silicone hydrogel contact lenses with alcohol-based liquids and the like, with aqueous washing steps, it has become apparent that reducing the occurrence of clinical non-wetting spots on such washed silicone hydrogel contact lenses is difficult. Additionally, the use of aqueous washing liquids free of volatile organic solvents can eliminate the need for a separate rinsing and hydration step.

New silicone hydrogel contact lenses have been invented. The present contact lenses comprise, or consist of, lens bodies comprising a polymeric component and a liquid component. The polymeric component comprises units of one or more siloxanes, and one or more non-siloxane reactive ingredients. It can therefore be understood that the polymeric component is the reaction product of a polymerizable composition comprising one or more siloxanes, and one or more non-siloxane reactive ingredients. The ingredients of the polymerizable composition can be monomers, macromers, pre-polymers, polymers, or combinations thereof. The combination of the polymeric component and the liquid component is present as a hydrated silicone hydrogel contact lens, which is suitable for placement on an eye of a person. The contact lens comprises a convex anterior surface and a concave posterior surface, and has an equilibrium water content (EWC) greater than 10% weight by weight (wt/wt). During the manufacture of the silicone hydrogel contact lenses, the lens bodies have not been extracted with a volatile organic solvent, such as a liquid composition comprising, consisting essentially of, or consisting of, a volatile organic solvent. Examples of volatile organic solvents that are excluded from the manufacture of the present silicone hydrogel contact lenses to remove an extractable component from polymerized lens bodies include primary alcohols, secondary alcohols, tertiary alcohols, or any combination thereof. Unlike commercially available silicone hydrogel contact lenses, the present silicone hydrogel contact lenses are only exposed to aqueous solutions that are free of volatile organic solvents to remove an extractable component from the polymerized lens bodies. The aqueous solutions may contain non-volatile organic ingredients, such as surfactants, wetting agents, anti-inflammatory agents, antioxidants, stabilizers, extraction aids, and the like, so long as the aqueous solution does not contain a volatile organic solvent. Thus, the present silicone hydrogel contact lenses are understood to be aqueous extracted contact lenses. As discussed herein, an aqueous extracted contact lens is chemically and physically different and distinct from an organic solvent extracted contact lens.

The present silicone hydrogel contact lenses comprise aqueous extracted lens bodies. The aqueous extracted lens bodies each have an anterior surface and an opposing posterior surface, the posterior surface being the surface adjacent to the corneal epithelium of an eye on which the lens body is located. The anterior surfaces of the lens bodies of the present disclosure are associated with a reduced incidence of non-wetting spots compared to other daily disposable silicone hydrogel contact lenses. Based on studies, other commercially available daily disposable silicone hydrogel contact lenses, when worn on a population of contact lens wearers' eyes and observed under conventional slit lamp examinations, have non-wetting spots on at least 5% of the lenses. For some batches of commercially available daily disposable silicone hydrogel contact lenses, the incidence of non-wetting spots present on the contact lenses has been observed to be over 20%. In comparison, using the same examination techniques, the silicone hydrogel contact lenses disclosed herein have non-wetting spots on less than 5% of the lenses worn on patient's eyes.

Thus, the inventors have invented new silicone hydrogel contact lenses with desirable clinical surface wettabilities without requiring the use of volatile organic solvents to remove extractable material from the lens bodies during the manufacture thereof. In addition, the surface wettabilities have been achieved without requiring a plasma treatment of the polymerized lens product, or a polymeric internal wetting agent, such as polyvinyl pyrrolidone (PVP) in the contact lens formulation. It can be understood that a problem of producing silicone hydrogel contact lenses with clinically desirable surface wettabilities and without extracting the lens bodies with a volatile organic solvent has now been identified and solved.

Thus, silicone hydrogel contact lenses are produced without using volatile organic solvents to extract materials from the polymerized contact lens bodies, and instead are washed with aqueous liquids. The silicone hydrogel contact lenses so produced have ophthalmically wettable lens surfaces such that less than five percent of a batch of twenty or more such silicone hydrogel contact lenses have visually identifiable non-wetting spots when the contact lenses are located on eyes of subjects.

In accordance with the present disclosure, a method of manufacturing a batch of silicone hydrogel contact lenses comprises providing polymerized silicone hydrogel contact lens bodies in contact lens mold assemblies. A single polymerized silicone hydrogel contact lens body is provided in a single contact lens mold assembly. Each contact lens mold assembly comprises a first mold section (front surface mold section) having a concave optical surface for forming an anterior surface of the silicone hydrogel contact lens body and a second mold section (back surface mold section) having a convex optical surface for forming a posterior surface of the silicone hydrogel contact lens body. The first mold section and second mold section are coupled together to form the contact lens mold assembly.

The method comprises separating the polymerized silicone hydrogel contact lens bodies from the contact lens mold assemblies to produce delensed contact lens bodies. This can be accomplished by separating the first mold section and the second mold section from each other so that the polymerized silicone hydrogel contact lens body remains adhered to one of the mold sections. The polymerized silicone hydrogel contact lens body can then be mechanically separated from the mold section without liquid, or can be separated from the mold section using a liquid, such as by immersing the mold section and lens in a volume of liquid, or by soaking the mold until the lens floats off the mold, or by applying a liquid to the mold section to soak the lens body, or by dissolving the mold in a liquid.

The method further comprises washing the delensed contact lens bodies with an aqueous liquid free of volatile organic solvent to produce washed contact lenses. These washed contact lenses can be understood to be aqueous extracted contact lenses.

The washed contact lenses are then sterilized in sealed contact lens packages, such as by autoclaving the lenses in the sealed packages.

In one example, the silicone hydrogel contact lenses are not contacted by a liquid comprising a volatile organic solvent during any step of the manufacturing process (i.e., all liquids which contact the lens during manufacturing are free of a volatile organic solvent).

In one example, the method of manufacturing a batch of silicone hydrogel contact lenses of the present disclosure is a method comprising: providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

The batch so manufactured comprises at least twenty silicone hydrogel contact lenses, and the anterior surfaces of the sterilized contact lenses have clinically acceptable surface wettabilities. As used herein, such clinically acceptable surface wettabilities are based on less than five percent of the silicone hydrogel contact lenses having visually identifiable non-wetting spots when located on eyes of subjects or people. The non-wetting spots are discontinuities of the contact lens wearer's pre-lens tear film present on the anterior surface of the contact lens, and are visually identifiable during a slit lamp examination at a total magnification from about 6× to about 70×, or using other conventional eye and lens examination techniques, such as those disclosed in U.S. Pat. No. 4,747,683, which provide techniques for determining the in vivo wettability of a contact lens by adding a dye, such as fluorescein, to the tear fluid to visualize the thin prelens tear film.

Another example of the present disclosure relates to a batch of silicone hydrogel contact lenses so produced.

In one example, a batch of silicone hydrogel contact lenses in accordance with the present disclosure is a batch comprising: at least twenty silicone hydrogel contact lenses, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Additional examples of the present disclosure are set forth in the claims. For example, some of the present methods and batches of silicone hydrogel contact lenses relate to the use of certain polar resins, such as polybutylene terephthalate (PBT), to form contact lens mold sections used to cast the silicone hydrogel contact lenses. Some of the present methods and batches of silicone hydrogel contact lenses relate to new combinations of ingredients, such as siloxane monomers, hydrophilic monomers, hydrophobic monomers, cross-linking agents, and the like which surprisingly provide ophthalmically compatible or wettable lens surfaces, even when such polymerizable compositions or formulations are cast in contact lens mold assemblies made from non-polar resins, such as polypropylene. These contact lenses with wettable surfaces are obtained without exposing or contacting the polymerized lenses with volatile organic solvents, and instead are washed with aqueous liquids.

Additional embodiments of the polymerizable compositions, present lenses, lens products, batches of lenses, and methods of manufacturing contact lenses will be apparent from the following description, Examples, and claims. As can be appreciated from the foregoing and following description, each and every feature described herein, and each and every combination of two or more of such features, and each and every combination of one or more values defining a range, are included within the scope of the present invention provided that the features included in such a combination are not mutually inconsistent. In addition, any feature or combination of features or any value(s) defining a range may be specifically excluded from any embodiment of the present invention.

DETAILED DESCRIPTION

As described herein, it has now been discovered that silicone hydrogel contact lenses can be produced with clinically acceptable surface wettabilities without contacting the polymerized silicone hydrogel contact lenses with one or more volatile organic solvents, especially during processing steps between separating the lenses from mold assemblies and packaging the lenses. Such clinically acceptable silicone hydrogel contact lenses can be produced without requiring a surface treatment of a polymerized lens body to achieve the wettability, without including a hydrophilic polymer in the formulation used to make the contact lenses, or without using an organic diluent in the formulation to reduce phase separation of hydrophobic and hydrophilic components of the formulation.

In accordance with the present disclosure, methods of manufacturing a batch of silicone hydrogel contact lenses are provided. The methods comprise a step of providing polymerized silicone hydrogel contact lens bodies in contact lens mold assemblies. Each contact lens mold assembly comprises a first mold section and a second mold section. The first and second mold section are coupled together to provide a contact lens shaped cavity between the first and second mold section. The first mold section has a concave optical surface, which forms the anterior surface of the silicone hydrogel contact lens body. The first mold section may thus be understood to be a front surface mold section. The second mold section has a convex optical surface, which forms the posterior surface of the silicone hydrogel contact lens body. The second mold section may thus be understood to be a rear surface mold section.

The contact lenses so provided can be provided by forming the polymerized silicone hydrogel contact lens bodies in the contact lens mold assemblies by polymerizing the contact lens formulation or polymerizable composition to form the silicone hydrogel contact lens body. The polymerization can occur by exposing the contact lens mold assemblies to thermal radiation, ultraviolet radiation, visible light, and the like.

The providing step can also be understood to be a step in which polymerized silicone hydrogel contact lens bodies located in the contact lens mold assemblies are provided to a separate entity for further processing, such as separating the lens bodies from the mold assemblies and washing and packaging the separated lens bodies. Thus, it is possible for a single manufacturer to form polymerized silicone hydrogel contact lens bodies, and further process them to form packaged silicone hydrogel contact lenses, or the manufacturer can form the polymerized silicone hydrogel contact lens bodies and provide them to other companies for further processing to sell the contact lenses under their own label or brand.

In the present methods, the polymerized silicone hydrogel contact lens bodies are separated from the contact lens mold assemblies to produce delensed contact lens bodies. As discussed herein in more detail, such methods may further comprise separating the first mold section and the second mold section such that the polymerized silicone hydrogel contact lens body remains attached to one of the mold sections. The polymerized silicone hydrogel contact lens can then be mechanically separated from the mold section without using a liquid, or can be contacted with a liquid to release the lens body from the mold section.

The delensed contact lens bodies are then washed with an aqueous liquid. The washing can be effective to remove dust or debris from the lens, to extract materials from the lens, to hydrate the lens, or any combination thereof. The aqueous liquid is free of a volatile organic solvent. The aqueous liquid can be deionized water. The aqueous liquid can be a solution of deionized water comprising a salt, wherein the aqueous liquid is free of a volatile organic solvent. The aqueous liquid can be a solution of deionized water comprising a buffering agent and having a particular desired pH, wherein the aqueous liquid is free of a volatile organic solvent. The aqueous liquid can be a solution of deionized water comprising a surfactant, wherein the aqueous liquid is free of an organic solvent. The aqueous liquid can be a solution of deionized water comprising an ophthalmically acceptable ingredient in an amount effective to reduce lens distortion during processing, wherein the aqueous liquid is free of a volatile organic solvent. The aqueous liquid can be a solution of deionized water comprising an ophthalmically acceptable ingredient in an amount effective to increase a level of extractable material removed from the lens during washing, wherein the aqueous liquid is free of an organic solvent. After washing, washed contact lenses are produced.

The washed contact lenses are placed in contact lens packages, such as blister packs or vials, which are then sealed, and sterilized, such as by autoclaving, as understood by persons of ordinary skill in the art.

In one example, the silicone hydrogel contact lenses are not contacted by a liquid comprising a volatile organic solvent during any step of the manufacturing process (i.e., all liquids which contact the lens during manufacturing are free of a volatile organic solvent).

One example of a method of manufacturing a batch of silicone hydrogel contact lenses of the present disclosure is a method comprising: providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the silicone hydrogel contact lenses are not contacted by a liquid comprising a volatile organic solvent during any step of the manufacturing process, and the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

One example of a batch of silicone hydrogel contact lenses in accordance with the present disclosure is a batch comprising: at least twenty silicone hydrogel contact lenses, each silicone hydrogel contact lens of the batch being an aqueous extracted silicone hydrogel contact lens not contacted by a liquid comprising a volatile organic solvent during any step of the manufacturing process, each contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

The batch of contact lenses so manufactured comprises at least twenty silicone hydrogel contact lenses. However, typically, batches will be greater than twenty, and may comprise at least one hundred, at least one thousand, or at least ten thousand silicone hydrogel contact lenses. As disclosed herein, the anterior surfaces of the sterilized silicone hydrogel contact lenses have clinically acceptable surface wettabilities such that less than five percent of the silicone hydrogel contact lenses have visually identifiable non-wetting spots when located on eyes of subjects or people. The non-wetting spots are discontinuities of the contact lens wearer's pre-lens tear film and are present on the anterior surface of the contact lens. The non-wetting spots are visually identifiable during a slit lamp examination by an eye care practitioner at a total magnification from about 6× to about 70×. Such examination techniques to determine the presence or absence of non-wetting spots are convention and understood by persons of ordinary skill in the art.

In some of the methods, at least one of the first mold section or the second mold section comprises a polar resin having a polarity from 1% to 7%. In some methods, both the first and second mold section comprises such a polar resin. One example of a polar resin that is useful in the present methods includes resins formed from polybutylene terephthalate (PBT). In some additional examples, the polar resins, such as PBT, used to form the first and second mold sections have a flexural modulus less than 3800 MPa.

One example of a method of manufacturing a batch of silicone hydrogel contact lenses of the present disclosure is a method comprising: providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, at least one of the first mold section or the second mold section comprises a polar resin having a polarity from 1% to 7%, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

One example of a batch of silicone hydrogel contact lenses in accordance with the present disclosure is a batch comprising: at least twenty silicone hydrogel contact lenses, each silicone hydrogel contact lens of the batch being molded in a single contact lens mold assembly, each contact lens mold assembly comprising a first mold section having a concave optical surface for forming an anterior surface of the silicone hydrogel contact lens body and a second mold section having a convex optical surface for forming a posterior surface of the silicone hydrogel contact lens body, at least one of the first mold section or the second mold section comprising a polar resin having a polarity from 1% to 7%, and each silicone hydrogel contact lens being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

As described herein, the polymerized contact lens bodies can be obtained by polymerizing a polymerizable composition in a contact lens mold assembly using thermal radiation, or ultraviolet radiation, or both. Typically, if thermal radiation is used, the polymerizable composition will include a thermal initiator. If ultraviolet radiation is used, the polymerizable composition will include an ultraviolet initiator. The curing times can vary depending on the silicone hydrogel contact lens being produced and frequently range from 20 minutes to 4 hours. In one example, a curing time of the polymerizable composition can be less than 20 minutes. In another example, a curing time of the polymerizable composition can be at least 20 minutes. In another example, the curing time can be less than 3 hours. In yet another example, the curing time can be more than 3 hours.

In some methods, the curing can be achieved by providing a curing profile where a certain temperature or certain light intensity is provided for a certain amount of time before changing to another temperature or intensity for another amount of time.

In any of the present methods, each polymerized silicone hydrogel contact lens body is obtained by polymerizing a polymerizable composition. Generally, the polymerizable composition comprises at least one siloxane monomer, at least one hydrophilic monomer, at least one hydrophobic monomer, and at least one cross-linking agent. For example, polymerizable compositions may comprise a first siloxane monomer, a second siloxane monomer, one or more hydrophilic monomers, one or more hydrophobic monomers, and one or more cross-linking agents. Additional details and various examples of the ingredients of the polymerizable compositions and the amounts and relationship among the ingredients are described herein. As one example, many of the present polymerizable compositions are free of a diluent, or free of a hydrophilic polymer, or both.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic monomer, at least one hydrophobic monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic monomer, at least one hydrophobic monomer, and at least one cross-linking agent, wherein the polymerizable composition is free of a diluent, or free of a hydrophilic polymer, or both, and wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic monomer, at least one hydrophobic monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic monomer, at least one hydrophobic monomer, and at least one cross-linking agent, wherein the polymerizable composition is free of a diluent, or free of a hydrophilic polymer, or both, and each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

In some detail, the siloxane monomer(s) in the present polymerizable compositions may be monofunctional or multifunctional, such as bifunctional or trifunctional. A monofunctional siloxane monomer has a single polymerizable functional group, such as an acrylic group, methacrylic group, or vinyl group. A multifunctional siloxane monomer has two or more such polymerizable functional groups. The polymerizable functional group(s) can be present on a side chain of the siloxane monomer, on the main chain or backbone of the siloxane monomer, or both on side chains and main chain for multifunctional siloxane monomers. In some of the polymerizable compositions described herein, the first siloxane monomer is a monofunctional siloxane monomer, and the second siloxane monomer is a multifunctional siloxane monomer. In further examples, the number average molecular weight of the first siloxane monomer is less than 2,000 daltons, or less than 1,000 daltons, or from 400 to 700 daltons. In examples containing a second multifunctional siloxane monomer, the second siloxane monomer has a number average molecular weight greater than 3,000 daltons. Some second siloxane monomers have a number average molecular weight greater than 5,000 daltons, or greater than 9,000 daltons. Frequently, the second multifunctional siloxane monomers have a number average molecular weight less than 20,000 daltons. The first siloxane monomer can be present in an amount from 20 to 45 unit parts, or from 25 to 40 unit parts or from 27 to 35 unit parts of the polymerizable composition. Additional details of the siloxane monomer(s) useful in any of the present methods are described herein.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer having a number average molecular weight of from 400 daltons to 700 daltons, a second siloxane monomer having a number average molecular weight of greater than 5,000 daltons, at least one hydrophilic monomer, at least one hydrophobic monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6x to about 70x.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer having a number average molecular weight of from 400 daltons to 700 daltons, a second siloxane monomer having a number average molecular weight of greater than 5,000 daltons, at least one hydrophilic monomer, at least one hydrophobic monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6x to about 70x.

In some of the present methods, particular combinations of ingredients are provided. For example, the present batches of silicone hydrogel contact lenses with clinically acceptable surface wettabilities can be manufactured by including at least one hydrophilic vinyl monomer and at least one vinyl cross-linking agent in the polymerizable composition. Such vinyl monomers and vinyl cross-linking agents are distinguished from methacrylate type monomers and methacrylate type cross-linking agents based on their differing reactivity ratios, among other things.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic vinyl-containing monomer, at least one hydrophobic monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6x to about 70x.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic vinyl-containing monomer, at least one hydrophobic monomer, and at least one vinyl-containing cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6x to about 70x.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic amide monomer having one N-vinyl group, at least one hydrophobic monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic amide monomer having one N-vinyl group, at least one hydrophobic monomer, and at least one vinyl-containing cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

Yet another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer, at least one hydrophilic vinyl-containing monomer, at least one hydrophobic monomer, and at least one cross-linking agent, wherein the polymerizable composition is free of a diluent, or free of a hydrophilic polymer, or both, and wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

On example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic vinyl-containing monomer, at least one hydrophobic monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic vinyl-containing monomer, at least one hydrophobic monomer, and at least one vinyl-containing cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic amide monomer having one N-vinyl group, at least one hydrophobic monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Yet another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, a second siloxane monomer, at least one hydrophilic vinyl-containing monomer, at least one hydrophobic monomer, and at least one cross-linking agent, wherein the polymerizable composition is free of a diluent, or free of a hydrophilic polymer, or both, and each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

In any of the present methods, the batch of sterilized silicone hydrogel contact lenses has an average diameter (i.e., average of each chord diameter for each silicone hydrogel contact lens or representative population of silicone hydrogel contact lenses) that is at least 20% greater than the average diameter of the same batch of silicone hydrogel contact lens bodies prior to the washing step of the present methods. Thus, the present silicone hydrogel contact lenses are produced at a certain size in a dry state, and after washing, the contact lenses have swollen to their final size, which is at least 20% greater than their size in the dry state. This is in contrast to silicone hydrogel contact lenses that are produced with volatile organic solvent extraction steps. For example, in such silicone hydrogel contact lenses, the dry lenses are produced at a size that is substantially equal, and less than 20% different, than their final hydrated size. Thus, when such dry lenses are contacted with a volatile organic solvent, such as ethanol and the like, the individual contact lenses will swell to approximately twice their dry size, and then by removing the alcohol with aqueous solutions to produce a hydrated contact lens, the hydrated contact lens size has returned to its original size, within specified target dimensions.

In any of the present methods in accordance with the present disclosure, silicone hydrogel contact lenses with clinically desirable properties are manufactured. For example, each of the sterilized silicone hydrogel contact lenses has an oxygen permeability of at least 55 barrers, or an equilibrium water content from about 30% wt/wt to about 70% wt/wt, or a tensile modulus from about 0.2 MPa to about 0.9 MPa, or any combination thereof. In some examples, each of the sterilized silicone hydrogel contact lenses has an oxygen permeability of at least 55 barrers, or an equilibrium water content from about 30% wt/wt to about 70% wt/wt, and a tensile modulus from about 0.2 MPa to about 0.9 MPa.

Practicing the present methods results in the manufacture of a batch of silicone hydrogel contact lenses. The batch, as described herein, comprises at least twenty silicone hydrogel contact lenses, although the batch can include more. Each silicone hydrogel contact lens of the batch is an aqueous extracted silicone hydrogel contact lens (e.g., it has not been washed or extracted with a volatile organic solvent). Each silicone hydrogel contact lens comprises an anterior surface and an opposing posterior surface. The posterior surface is dimensioned, such as being sized and shaped, for placement against a subject's eye. The anterior surface of each of the aqueous extracted contact lenses has a clinically acceptable surface wettability, such that less than five percent of the batch of silicone hydrogel contact lenses has visually identifiable non-wetting spots when located on eyes of subjects. As described herein, the non-wetting spots are discontinuities of the contact lens wearer's pre-lens tear film present on the anterior surface of the lens, and are visually identifiable during a slit lamp examination at a total magnification from about 6× to about 70×.

In some examples, the batch of silicone hydrogel contact lenses is a cast molded silicone hydrogel contact lens without a plasma surface treatment or a polymeric internal wetting agent that is provided by including a hydrophilic polymer in a polymerizable composition used to form the silicone hydrogel contact lens. A cast molded contact lens is understood to be a contact lens polymerized from a polymerizable composition in a contact lens mold assembly comprising a first mold section and second mold section coupled together, as described herein.

As described herein, certain examples of the present silicone hydrogel contact lenses batches are cast molded between a first mold section and a second mold section formed from a polar resin having a polarity from about 1% to about 7%. In certain examples, the polar resin is polybutylene terephthalate (PBT).

One example of a method of manufacturing a batch of silicone hydrogel contact lenses of the present disclosure is a method comprising: providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, at least one of the first mold section or the second mold section comprises polybutylene terephthalate (PBT), and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×.

One example of a batch of silicone hydrogel contact lenses in accordance with the present disclosure is a batch comprising: at least twenty silicone hydrogel contact lenses, each silicone hydrogel contact lens of the batch being molded in a single contact lens mold assembly, each contact lens mold assembly comprising a first mold section having a concave optical surface for forming an anterior surface of the silicone hydrogel contact lens body and a second mold section having a convex optical surface for forming a posterior surface of the silicone hydrogel contact lens body, at least one of the first mold section or the second mold section comprising polybutylene terephthalate (PBT), and each silicone hydrogel contact lens being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×.

Any of the present batches may comprise silicone hydrogel contact lenses in which each contact lens comprises a polymeric component and a liquid component. The polymeric component comprises units of at least one siloxane, units of at least one hydrophilic monomer, units of at least one hydrophobic monomer, and units of at least one cross-linking agent. In some examples, the polymeric component comprises units of at least one siloxane having one or more functional acrylic groups, and units of one or more hydrophilic monomers having one or more functional non-acrylic vinyl groups.

Any of the present batches may comprise silicone hydrogel contact lenses in which each contact lens has an oxygen permeability of at least 55 barrers, or an equilibrium water content from about 30% wt/wt to about 70% wt/wt, or a tensile modulus from about 0.2 MPa to about 0.9 MPa, or any combination thereof. In some examples, each contact lens has an oxygen permeability of at least 55 barrers, or an equilibrium water content from about 30% wt/wt to about 70% wt/wt, and a tensile modulus from about 0.2 MPa to about 0.9 MPa.

In any of the present batches of silicone hydrogel contact lenses, each silicone hydrogel contact lens is provided in a sterilized contact lens packaging solution. In certain examples, each contact lens can have a wet extractable content less than 10% (wt/wt), as described herein.

Additional details of the present silicone hydrogel contact lenses, batches of silicone hydrogel contact lenses, and methods of manufacturing will now be described.

In some examples, the present silicone hydrogel contact lenses are produced from polymerizable compositions comprising a first siloxane monomer represented by formula (1):

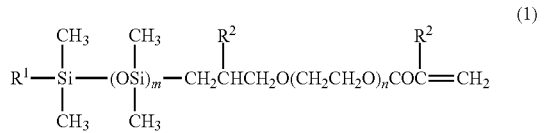

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; and a second siloxane monomer having more than one polymerizable functional group and having a number average molecular weight of at least 3,000 daltons, such as, for example, a number average molecular weight of at least 5,000 daltons, in the polymerizable composition. The first siloxane monomer and the second siloxane monomer are present in the polymerizable composition at a ratio of at least 2:1 based on unit parts by weight.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer represented by formula (1):

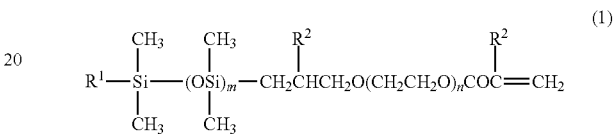

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, at least one hydrophilic vinyl-containing monomer, a second siloxane monomer having more than one polymerizable functional group and having a number average molecular weight of at least 5,000 daltons, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer represented by formula (1):

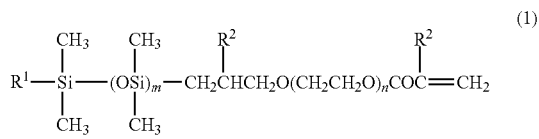

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, at least one hydrophilic vinyl-containing monomer, a second siloxane monomer having more than one polymerizable functional group and having a number average molecular weight of at least 5,000 daltons, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

The first siloxane monomer and the second siloxane monomer can be present in the polymerizable composition at a ratio of at least 2:1 based on unit parts by weight. In other words, for every unit part by weight of the second siloxane monomer present in the polymerizable composition, 2 or more unit parts of the first siloxane monomer are also present in the polymerizable composition. In accordance with the present disclosure, the first siloxane monomer and the second siloxane monomer can be present in the polymerizable composition in a ratio from about 2:1 to about 10:1 based on unit parts by weight of the first siloxane monomer to the second siloxane monomer. In another example, the first siloxane monomer and the second siloxane monomer can be present in the polymerizable composition in a ratio from about 3:1 to about 6:1 based on unit parts by weight. In yet another example, the first siloxane monomer and the second siloxane monomer can be present in the polymerizable composition in a ratio of about 4:1 based on unit parts by weight.

As used herein, 'unit parts' is understood to mean unit parts by weight. For example, to prepare a formulation described as comprising x unit parts of a first siloxane monomer and y unit parts of a second siloxane monomer, the composition can be prepared by combining x grams of the first siloxane with y grams of the second siloxane to obtain a total of x+y grams of polymerizable composition, or by combining x ounces of the first siloxane with y ounces of the second siloxane to obtain a total of x+y ounces of polymerizable composition, and so on. When the composition further comprises additional optional ingredients such as, for example, z unit parts of a cross-linking agent, z grams of the cross-linking agent are combined with x grams of the first siloxane monomer and y grams of the second siloxane to obtain a total of x+y+z grams of polymerizable composition, and so on. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

As discussed herein, the present contact lenses comprise, or consist of, hydrated lens bodies comprising a polymeric component and a liquid component. The polymeric component can comprise units of two or more siloxanes, and one or more non-silicon reactive ingredients. It can therefore be understood that the polymeric component can be the reaction product of a polymerizable composition comprising two or more siloxanes (the siloxane monomer component of the composition), and one or more non-silicon reactive ingredients. As used herein, a non-silicon reactive ingredient is understood to be an ingredient which has a polymerizable double bond as part of its molecular structure, but which does not have a silicon atom in its molecular structure. The ingredients of the polymerizable composition can be monomers, macromers, pre-polymers, polymers, or any combination thereof. Optionally, the ingredients of the polymerizable composition can further include at least one hydrophilic monomer, or at least one hydrophobic monomer, or at least one cross-linking agent. The at least one hydrophilic monomer, at least one hydrophobic monomer and at least one cross-linking agent are understood to be silicon-free reactive ingredients. As used herein, the at least one hydrophilic monomer can be understood to comprise a single hydrophilic monomer, or to comprise a hydrophilic monomer component composed of two or more hydrophilic monomers. Similarly, the at least one hydrophobic monomer can be understood to comprise a single hydrophobic monomer, or to comprise a hydrophobic monomer component composed of two or more hydrophobic monomers. The at least one cross-linking agent can be understood to comprise a single cross-linking agent, or to comprise a cross-linking agent component composed of two or more cross-linking agents. Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one chain transfer agent are understood to be non-silicon ingredients, and can be either non-polymerizable ingredients or polymerizable ingredients (i.e., ingredients having a polymerizable functional group as part of their molecular structure).

The combination of the polymeric component and the liquid component are present as a hydrated lens body, which is suitable for placement on an eye of a person. The hydrated lens body has a generally convex anterior surface and a generally concave posterior surface, and has an equilibrium water content (EWC) greater than 10% weight by weight (wt/wt). Thus, the present contact lenses can be understood to be soft contact lenses, which as used herein, refers to contact lenses that, when fully hydrated, can be folded upon themselves without breaking.

The present contact lenses can be either daily disposable contact lenses or non-daily disposable contact lenses.

In one example, the polymerizable composition of the present disclosure comprises a first siloxane monomer represented by formula (1):

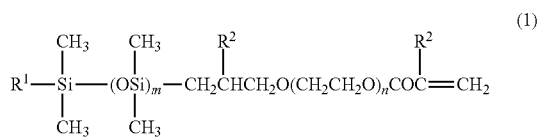

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. In other words, on a single molecule of the siloxane monomer represented by formula 1, the first $R^2$ of formula (1), (the $R^2$ which is closest to the $R^1$ end group on the left side of the molecule), can be either a hydrogen atom or a methyl group, and the second $R^2$ of formula (1) (the $R^2$ which is part of the methacrylate end group on the right side of the molecule), can also be either a hydrogen atom or a methyl group, regardless of whether the first $R^2$ of formula (1) is a hydrogen atom or a methyl group. The polymerizable composition also comprises a second siloxane monomer. The first siloxane monomer and the second siloxane monomer are present in the polymerizable composition at a ratio of at least 2:1 based on unit parts by weight. The second siloxane monomer has more than one polymerizable functional group (i.e., is a multifunctional siloxane monomer) and has a number average molecular weight of at least 3,000 daltons. If the second siloxane monomer has two polymerizable functional groups, such as two methacrylate groups, it is a bifunctional monomer. If the second siloxane monomer has three polymerizable functional groups, it is a trifunctional monomer. The polymerizable composition also comprises at least one hydrophilic monomer, or at least one hydrophobic monomer, or at least one cross-linking agent, or any combination thereof.

The present disclosure also relates to a new silicone hydrogel contact lens or to new silicone hydrogel contact lenses. A silicone hydrogel contact lens in accordance with the present disclosure comprises a polymeric lens body. The polymeric lens body is the reaction product of a polymerizable composition or contact lens formulation. The polymerizable composition used to produce the present silicone hydrogel contact lens or lenses comprises a first siloxane monomer represented by formula (1):

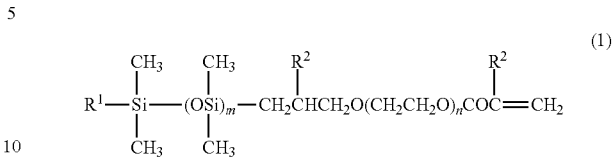

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. The polymerizable composition also comprises a second siloxane monomer having more than one polymerizable functional group and having a number average molecular weight of at least 3,000 daltons. The first siloxane monomer and the second siloxane monomer are present in the polymerizable composition at a ratio of at least 2:1 based on unit parts by weight. The polymerizable composition also comprises at least one hydrophilic monomer, or at least one hydrophobic monomer, or at least one cross-linking agent, or any combination thereof.

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the second siloxane monomer, or any other monomer, macromer, pre-polymer, or polymer, of the polymerizable composition is polydisperse, the term "molecular weight" refers to the number average molecular weight of the monomer or ingredient. As one example, a sample of the second siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

The molecular weight of the first siloxane monomer is less than 2,000 daltons. In one example, the molecular weight of the first siloxane monomer can be less than 1,000 daltons. In another example, the molecular weight of the first siloxane monomer can be from 400 to 700 daltons. Additional details of the first siloxane monomer can be understood from US20090299022, the entire content of which is hereby incorporated by reference. As can be appreciated from formula (1), the first siloxane monomer has a single methacrylic polymerizable end group.

In one example of the present contact lenses, the second siloxane monomer can have a number average molecular weight of at least 4,000 daltons, or at least 7,000 daltons, or at least 9,000 daltons, or at least 11,000 daltons. The number average molecular weight of the second siloxane monomer can be less than 20,000 daltons. Thus, in some contexts, the second siloxane monomer can be considered a macromer, but it will be referred to as a monomer herein since it forms a unit part of a polymer formed with the other reactive components of the polymerizable composition.

The polymerizable composition also comprises at least one hydrophilic monomer, or at least one hydrophobic monomer, or at least one cross-linking agent, or any combination thereof. As used herein, the preceding three types of chemicals are non-silicon chemicals (i.e., chemicals whose molecular structure does not include a silicon atom) and thus are different from the siloxane monomers present in the polymerizable compositions. The polymerizable compositions can be understood to comprise at least two siloxane monomers, and other non-silicon hydrophilic monomers, or non-silicon hydrophobic monomers, or non-silicon cross-linking agents, or any combination thereof, although, optionally, the polymerizable composition can further comprise at least a third siloxane monomer.

The first siloxane monomer, the second siloxane monomer and the optional at least one third siloxane monomer comprise the siloxane monomer component of the polymerizable composition. Each of the first siloxane monomer, or the second siloxane monomer, or the optional third siloxane monomer, or any combination thereof, can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers. For example, the second siloxane monomer, or the optional at least one third siloxane monomer, or any combination thereof, can contain hydrophilic components within the main chain of the siloxane molecule, can contain hydrophilic components within one or more side chains of the siloxane molecule, or any combination thereof.

The hydrophilicity or hydrophobicity of a monomer can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams of the monomer are visibly fully soluble in 1 liter of water at 20° C. (i.e., ≥5% soluble in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20° C.

In one example of the present contact lenses, the first siloxane monomer can be represented by formula (1) where m of formula (1) is 4, n of formula (1) is 1, $R^1$ of formula (1) is a butyl group, and each $R^2$ of formula (1) is independently either a hydrogen atom or a methyl group. One example of such a first siloxane monomer is identified herein as Si1 in the Examples.

In another example of the present contact lenses, the second siloxane monomer can be a dual-end methacrylate end-capped polydimethylsiloxane having a number average molecular weight of at least 4,000 daltons. It will be understood that such siloxane monomers are bifunctional.

As an example of a bifunctional siloxane monomer useful in the present silicone hydrogel contact lenses, the second siloxane monomer can be represented by formula (2):

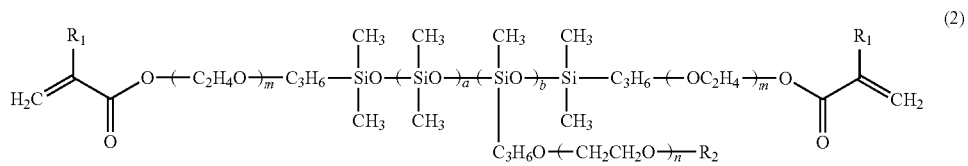

For example, the siloxane monomer can have at least one unit of ethylene glycol adjacent to a polymerizable functional group in the main chain of the siloxane molecule. The at least one unit of ethylene glycol adjacent to a polymerizable functional group in the main chain of the siloxane molecule can be separated from the polymerizable functional group by a carbon chain 1-10 units in length (i.e., where the ethylene glycol unit is bonded to the first carbon in the chain, and the polymerizable functional group is bonded to the last carbon in the chain). The siloxane monomer can have at least one unit of ethylene glycol adjacent to polymerizable functional groups present on both ends of the main chain of the siloxane molecule. The siloxane monomer can have at least one unit of ethylene glycol present in at least one side chain of the siloxane molecule. The at least one unit of ethylene glycol present in at least one side chain of the siloxane molecule can be part of a side chain bonded to a silicon atom of the main chain of the siloxane molecule. The siloxane molecule can have both at least one unit of ethylene glycol adjacent to polymerizable functional groups present on both ends of the main chain of the siloxane molecule, and at least one unit of ethylene glycol present in at least one side chain of the siloxane molecule.

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. In one example in which the second siloxane monomer is a monomer represented by formula (2), m of formula (2) is 0, n of formula (2) is an integer from 5 to 15, a is an integer from 65 to 90, b is an integer from 1 to 10, $R_1$ of formula (2) is a methyl group, and $R_2$ of formula (2) is either a hydrogen atom or a hydrocarbon group having 1 to 4 carbon atoms. One example of such a second siloxane monomer as represented by formula (2) is abbreviated Si2 in the Examples. The number average molecular weight for this second siloxane monomer represented by formula (2) can be from about 9,000 daltons to about 10,000 daltons. In another example, the second siloxane monomer represented by formula (2) can have a molecular weight from about 5,000 daltons to about 10,000 daltons. It can be appreciated that the second siloxane represented by formula (2) is a bifunctional siloxane having two terminal methacrylic groups. Additional details of this second siloxane monomer can be found in US20090234089, the entire content of which is incorporated herein by reference.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer, a second siloxane monomer represented by formula (2):

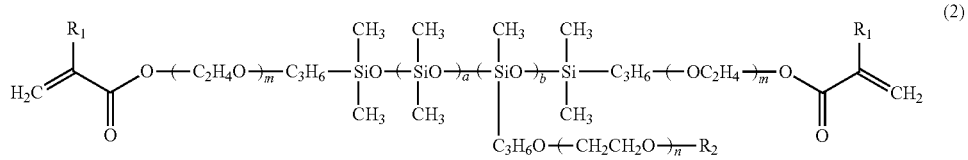

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer having a number average molecular weight of from 400 daltons to 700 daltons, a second siloxane monomer represented by formula (2):

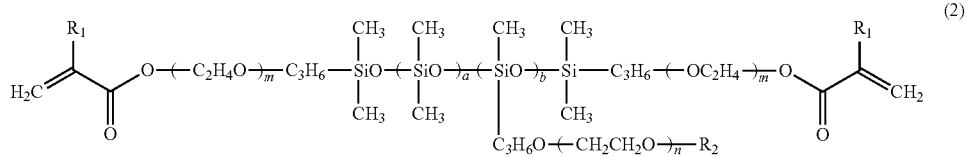

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Yet another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first siloxane monomer represented by formula (1):

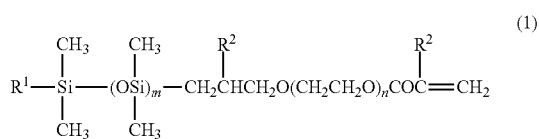

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, a second siloxane monomer represented by formula (2):

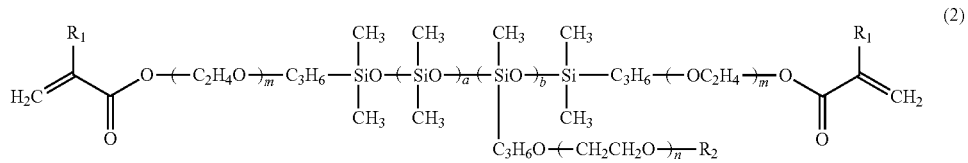

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer, second siloxane monomer represented by formula (2):

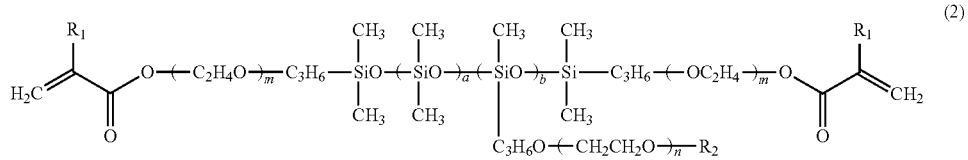

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer having a number average molecular weight of from 400 daltons to 700 daltons, a second siloxane monomer represented by formula (2):

20-500; b/(a+b) is equal to 0.01-0.22; and the configuration of siloxane units includes a random configuration, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Yet another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first siloxane monomer represented by formula (1):

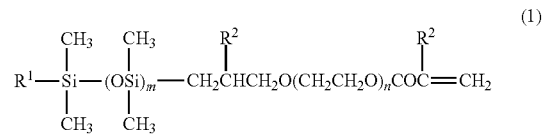

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, a second siloxane monomer represented by formula (2):

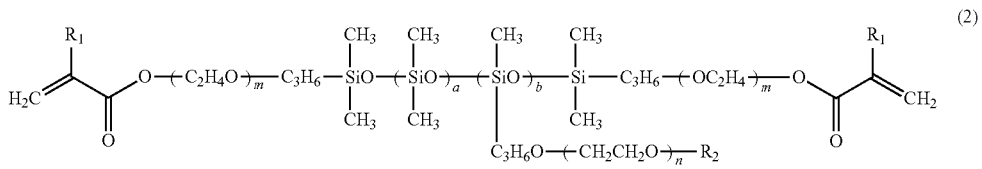

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

As another example of a bifunctional siloxane monomer useful in the present silicone hydrogel contact lenses, the second siloxane monomer can be represented by formula (3):

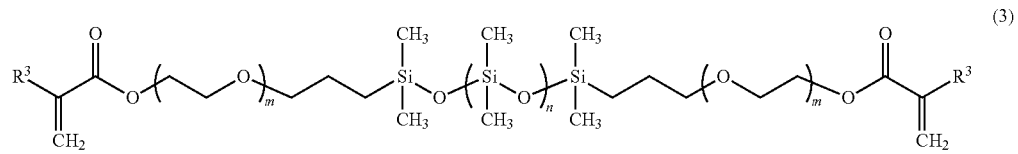

wherein $R^3$ is selected from either hydrogen atom or a methyl group, m of formula (3) represents an integer from 0 to 10, and n of formula (3) represents an integer from 1 to 500. In one example, the second siloxane monomer is represented by formula 3, and $R^3$ is a methyl group, m of formula (3) is 0, and n of formula (3) is one integer from 40 to 60. The second siloxane monomer of this example is represented by formula (4), and is abbreviated Si3 in the Examples (available from Gelest, Inc. (Morrisville, Pa., USA) as product code DMS-R18):

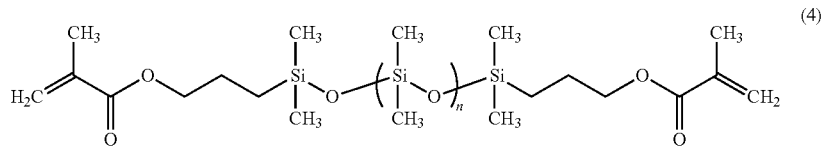

The siloxane of formula (4) can have a number average molecular weight from about 4,000 to about 4,500 daltons.

Another example of a second siloxane monomer that can be included in the present polymerizable compositions is represented by formula (5) below:

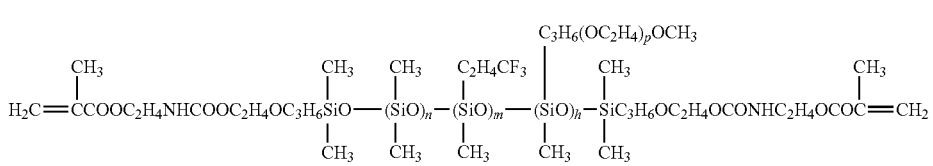

wherein n is an integer from 100 to 140, m and p are both integers from 6-9, h is an integer from 3-6, and the Mn=12,800, and the Mw=16,200. The siloxane monomer of formula (5) has a chemical name of α-ω-Bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane).

In some polymerizable compositions that include the siloxane monomer of formula (5), a monofunctional siloxane monomer can be provided in the composition as represented by formula (6):

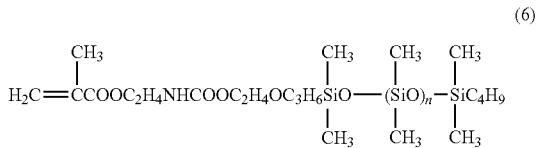

wherein n is an integer from 13-16, and the molecular weight is about 1500 daltons. The monofunctional siloxane monomer of formula (6) has a chemical name of α-Methacryloyloxyethyl iminocarboxyethyloxypropyl-poly(dimethylsiloxy)-butyldimethylsilane. Silicone hydrogel contact lenses comprising units of the siloxane monomer of formula (5) and formula (6) can be cast molded in PBT contact lens mold assemblies and washed without volatile organic solvents and have clinically acceptable surface wettabilities, as described herein.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a siloxane monomer represented by formula (6):

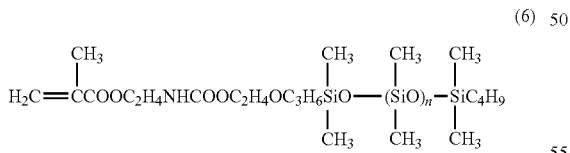

wherein n is an integer from 13-16, and the molecular weight is about 1500 daltons, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Another example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a siloxane monomer represented by formula (6):

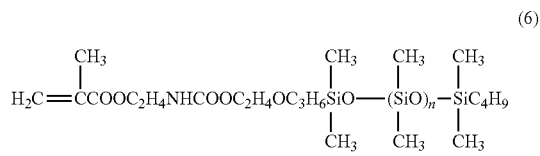

wherein n is an integer from 13-16, and the molecular weight is about 1500 daltons, at least one hydrophobic vinyl-containing monomer, and at least one cross-linking agent, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, at least one of the first mold section and the second mold section comprising a polar material resin, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a siloxane monomer represented by formula (6):

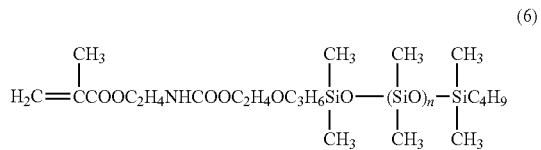

wherein n is an integer from 13-16, and the molecular weight is about 1500 daltons, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

Another example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition cured in a contact lens mold assembly, each contact lens mold assembly comprising a first mold section having a concave optical surface for forming an anterior surface of the silicone hydrogel contact lens body and a second mold section having a convex optical surface for forming a posterior surface of the silicone hydrogel contact lens body, at least one of the first mold section or the second mold section comprising a polar resin, the polymerizable composition comprising a siloxane monomer represented by formula (6):

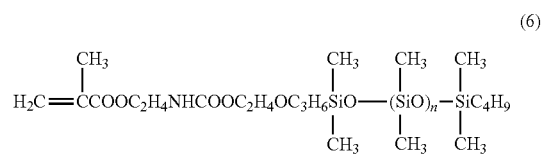

wherein n is an integer from 13-16, and the molecular weight is about 1500 daltons, at least one hydrophobic vinyl-containing monomer, and at least one cross-linking agent, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6× to about 70×. In one example, the at least one hydrophilic vinyl-containing monomer can comprise a hydrophilic amide monomer having one N-vinyl group, or the at least one cross-linking agent can comprise a vinyl-containing cross-linking agent, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

The polymerizable compositions used to prepare the present silicone hydrogel contact lenses can also include additional ingredients other than those described above. For example, some polymerizable compositions can include at least one third siloxane monomer. The polymerizable compositions can comprise one third siloxane monomer, or can comprise a third siloxane monomer component where the third siloxane monomer component is comprised of two or more one siloxane monomers, each of which differ from the first siloxane monomer and the second siloxane monomer of the polymerizable composition. Examples of the third siloxane monomer or third siloxane monomer component can include poly (organosiloxane) monomers or macromers or prepolymers, such as, for example, 3-[tris(trimethylsiloxy) silyl]propyl allyl carbamate, or 3-[tris(trimethylsiloxy)silyl] propyl vinyl carbamate, or trimethylsilylethyl vinyl carbonate, or trimethylsilylmethyl vinyl carbonate, or 3-[tris (trimethylsilyloxy) silyl]propyl methacrylate (TRIS), or 3-methaycryloxy-2-hydroxypropyloxy) propylbis (trimethylsilyloxy)methylsilane (SiGMA), or methyldi (trimethylsiloxy) silylpropylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the at least one third siloxane can comprise one or more of the first siloxanes described herein or the second siloxanes described herein, wherein the at least one third siloxane differs from the first siloxane and the second siloxane present in the polymerizable composition based on molecular weight, molecular formula, or both molecular weight and formula. For example, the third siloxane monomer can be a siloxane monomer of formula (1) having a different molecular weight than the first siloxane monomer of the polymerizable composition. In another example, the at least one third siloxane can comprise at least one of the siloxanes disclosed in the following patents: US2007/0066706, US2008/0048350, U.S. Pat. No. 3,808, 178, U.S. Pat. No. 4,120,570, U.S. Pat. No. 4,136,250, U.S. Pat. No. 4,153,641, US470533, U.S. Pat. No. 5,070,215, U.S. Pat. No. 5,998,498, U.S. Pat. No. 5,760,100, U.S. Pat. No. 6,367,929, and EP080539, the entire content of which are hereby incorporated by reference.

As previously stated, optionally, the polymerizable compositions of the present disclosure can comprise at least one hydrophilic monomer. The polymerizable compositions can comprise a single hydrophilic monomer, or can comprise two or more hydrophilic monomers present as the hydrophilic monomer component. Non-silicon hydrophilic monomers which can be used as the hydrophilic monomer or the hydrophilic monomer component in the polymerizable compositions disclosed herein include, for example, acrylamide-containing monomers, or acrylate-containing monomers, or acrylic acid-containing monomers, or methacrylate-containing monomers, or methacrylic acid-containing monomers, or any combination thereof. In one example, the hydrophilic monomer or monomer component can comprise or consist of a methacrylate-containing hydrophilic monomer. It is understood that the hydrophilic monomer or hydrophilic monomer component is a non-silicon monomer. Examples of hydrophilic monomers which can be included in the present polymerizable compositions can include, for example, N,N-dimethylacrylamide (DMA), or 2-hydroxyethyl acrylate, or 2-hydroxyethyl methacrylate (HEMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethyleneglycol monomethacrylate, or methacrylic acid, or acrylic acid, or any combination thereof.

In one example, the hydrophilic monomer or hydrophilic monomer component can comprise or consist of a vinyl-containing monomer. Examples of hydrophilic vinyl-containing monomers which can be provided in the polymerizable compositions include, without limitation, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or N-vinyl-N-ethyl formamide, or N-vinyl formamide, or N-2-hydroxyethyl vinyl carbamate, or N-carboxy-β-alanine N-vinyl ester, 1,4-butanediol vinyl ether (BVE), or ethylene glycol vinyl ether (EGVE), or diethylene glycol vinyl ether (DEGVE), or any combination thereof.

In another example, the hydrophilic monomer or hydrophilic monomer component of the polymerizable composition can comprise or consist of a hydrophilic amide monomer. The hydrophilic amide monomer can be a hydrophilic amide monomer having one N-vinyl group, such as, for example, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic monomer or hydrophilic monomer component comprises N-vinyl-N-methyl acetamide (VMA). For example, the hydrophilic monomer or monomer component can comprise or consist of VMA. In one particular example, the hydrophilic monomer can be VMA.

In another example, the hydrophilic vinyl-containing monomer or monomer component can comprise or consist of a vinyl ether-containing monomer. Examples of vinyl ether-containing monomers include, without limitation, 1,4-butanediol vinyl ether (BVE), or ethylene glycol vinyl ether (EGVE), or diethylene glycol vinyl ether (DEGVE), or any combination thereof. In one example, the hydrophilic monomer component comprises or consists of BVE. In another example, the hydrophilic monomer component comprises or consists of EGVE. In yet another example, the hydrophilic vinyl component comprises or consists of DEGVE. In one particular example, the vinyl ether-containing monomer can be a vinyl ether-containing monomer which is more hydrophilic than BVE, such as, for example, DEGVE. In another example, the hydrophilic monomer of the polymerizable composition can be a mixture of a first hydrophilic monomer which is a vinyl-containing monomer but which is not a vinyl ether-containing monomer, and a second hydrophilic monomer which is a vinyl ether containing monomer. Such mixtures include, for example, mixtures of VMA and one or more vinyl ethers such as, for example, BVE, or DEGVE, or EGVE, or any combination thereof.

When present, the hydrophilic vinyl ether-containing monomer can be present in the polymerizable composition in an amount from about 1 to about 15 unit parts, or from about 3 to about 10 unit parts. When present as a mixture with a hydrophilic vinyl-containing monomer which is not a vinyl ether, the hydrophilic vinyl-containing monomer which is not a vinyl ether and the hydrophilic vinyl ether-containing monomer can be present in the polymerizable composition at a ratio of at least 3:1, or from about 3:1 to about 15:1, or of about 4:1 based on the ratio of the unit parts of the hydrophilic vinyl-containing monomer which is not a vinyl ether to the unit parts of the hydrophilic vinyl ether-containing monomer.

In yet another example, the hydrophilic vinyl-containing monomer component can comprise or consist of a combination of a first hydrophilic monomer or monomer component, and a second hydrophilic monomer or hydrophilic monomer component. In one example, the first hydrophilic monomer has a different polymerizable functional group than the second hydrophilic monomer. In another example, each monomer of the first hydrophilic monomer has a different polymerizable functional group than the second hydrophilic monomer. In another example, the first hydrophilic monomer has a different polymerizable functional group than each monomer of the second hydrophilic monomer component. In yet another example, each monomer of the first hydrophilic monomer component has a different polymerizable functional group than each monomer of the second hydrophilic monomer component.

For example, when the first hydrophilic monomer or monomer component comprises or consists of one or more amide-containing monomers, the second hydrophilic monomer or monomer component can comprise or consist of one or more non-amide monomers (i.e., one or more monomers each of which do not have an amide functional group as part of their molecular structures). As another example, when the first hydrophilic monomer or monomer component comprises or consists of one or more vinyl-containing monomers, the second hydrophilic monomer or monomer component can comprise one or more non-vinyl monomers (i.e., one or more monomers each of which do not have a vinyl polymerizable functional group as part of their molecular structures). In another example, when the first hydrophilic monomer or monomer component comprises or consists of one or more amide monomers each having an N-vinyl group, the second hydrophilic monomer or monomer component can comprise or consist of one or more non-amide monomers. When the first hydrophilic monomer or monomer component comprise or consists of one or more non-acrylate monomers (i.e., one or more monomers each of which do not have an acrylate or methacrylate polymerizable functional group as part of their molecular structures), the second hydrophilic monomer or monomer component can comprise or consist of one or more acrylate-containing monomers, or one or more methacrylate-containing monomers, or any combination thereof. When the first hydrophilic monomer or monomer components comprises or consists of one or more non-vinyl ether-containing monomers (i.e., one or more monomers each of which do not have a vinyl ether polymerizable functional group as part of their molecular structures), the second hydrophilic monomer or monomer component can comprise or consist of one or more vinyl ether-containing monomers. In a particular example, the first hydrophilic monomer or monomer component can comprise or consist of one or more amide-containing monomers each having an N-vinyl group, and the second hydrophilic monomer or monomer component can comprise or consist of one or more vinyl ether-containing monomers.

In one example, when the first hydrophilic monomer or monomer component comprises or consists of a hydrophilic amide-containing monomer having one N-vinyl group, the second hydrophilic monomer or monomer component can comprise or consist of a vinyl ether-containing monomer. In a particular example, the first hydrophilic monomer can comprise VMA, and the second hydrophilic monomer or monomer component can comprise BVE or EGVE or DEGVE or any combination thereof. The first hydrophilic monomer can comprise VMA and the second hydrophilic monomer can comprise BVE. The first hydrophilic monomer can comprise VMA and the second hydrophilic monomer can comprise EGVE. The first hydrophilic monomer can comprise VMA and the second hydrophilic monomer can comprise DEGVE. The first hydrophilic monomer can comprise VMA, and the second hydrophilic monomer component can comprise EGVE and DEGVE.

Similarly, the first hydrophilic monomer can be VMA, and the second hydrophilic monomer or monomer component can comprise BVE or EGVE or DEGVE or any combination thereof. The first hydrophilic monomer can be VMA and the second hydrophilic monomer can be BVE. The first hydrophilic monomer can be VMA and the second hydrophilic monomer can be EGVE. The first hydrophilic monomer can comprise VMA and the second hydrophilic monomer can be DEGVE. The first hydrophilic monomer can be VMA, and the second hydrophilic monomer component can be a combination of EGVE and DEGVE.

In another example, the non-silicon hydrophilic vinyl-containing monomer can have any molecular weight, such as a molecular weight less than 400 daltons, or less than 300 daltons, or less than 250 daltons, or less than 200 daltons, or less than 150 daltons, or from about 75 to about 200 daltons.

When a hydrophilic monomer or a hydrophilic monomer component is present in the polymerizable composition, the hydrophilic monomer or monomer component can be present in the polymerizable composition in an amount from 30 to 60 unit parts of the polymerizable composition. The hydrophilic monomer or monomer component can be present in the polymerizable composition from 40 to 55 unit parts, or from 45 to 50 unit parts by weight. When the hydrophilic monomer component of the polymerizable composition comprises a first hydrophilic monomer or monomer component and a second hydrophilic monomer or monomer component, the second hydrophilic monomer or monomer component can be present in the polymerizable composition in an amount from 0.1 to 20 unit parts of the polymerizable composition. For example, of the total amount of from 30 to 60 unit parts of hydrophilic monomer or monomer component present in the polymerizable composition, 29.9 to 40 unit parts can comprise the first hydrophilic monomer or monomer component, and 0.1 to 20 unit parts can comprise the second hydrophilic monomer or monomer component. In another example, the second hydrophilic monomer or monomer component can be present in the polymerizable composition from 1 to 15 unit parts, or from 2 to 10 unit parts, or from 3 to 7 unit parts.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ether, vinyl ester, and allyl ester polymerizable groups. Thus, as used herein, examples of vinyl-containing monomers include monomers having a single vinyl amide, a single vinyl ether, a single vinyl ester, or a single allyl ester polymerizable group.

In addition, the polymerizable compositions of the present disclosure can optionally comprise at least one non-silicon hydrophobic monomer. The at least one hydrophobic monomer of the polymerizable composition can be one hydrophobic monomer, or can comprise a hydrophilic monomer component composed of at least two hydrophilic monomers. Examples of hydrophobic monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or ethylene glycol methyl ether methacrylate (EGMA), or any combination thereof. In one particular example, the hydrophobic monomer or monomer component can comprise or consist of methyl methacrylate, or ethylene glycol methyl ether methacrylate, or both.

When present in the polymerizable composition, the hydrophobic monomer or monomer component can be present in an amount from about 5 to about 25 unit parts, or from about 10 to about 20 unit parts.

In one example, the hydrophobic monomer component can comprise at least two hydrophobic monomers each having different polymerizable functional groups. In another example, the hydrophobic monomer component can comprise at least two hydrophobic monomers each having the same polymerizable functional group. The hydrophilic monomer component can comprise or consist of two hydrophobic monomers, both having the same polymerizable functional group. In one example, the hydrophilic monomer component can comprise or consist of two hydrophobic methacrylate-containing monomers. The hydrophilic monomer component can comprise or consist of MMA and EGMA. In one example, the at least two hydrophobic monomers of the hydrophobic monomer component can comprise or consist of MMA and EGMA, and the ratio of the amounts of MMA and EGMA present in the polymerizable composition can be from about 6:1 to about 1:1 based on the unit parts of MMA to the unit parts of EGMA. The ratio of the unit parts of MMA and EGMA present in the polymerizable composition can be about 2:1 based on the unit parts of MMA to the unit parts of EGMA.

Optionally, the polymerizable composition can further comprise at least one cross-linking agent. The polymerizable composition can comprise one cross-linking agent, or can comprise a cross-linking agent component comprised of at least two cross-linking agents. As used herein, a cross-linking agent is a non-silicon cross-linking agent and thus is different from multifunctional siloxane monomers which may be present in the polymerizable compositions.

In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. Non-silicon cross-linking agents that can be used in the polymerizable compositions disclosed herein include, for example, without limitation, allyl (meth)acrylate, or lower alkylene glycol di(meth)acrylate, or poly(lower alkylene) glycol di(meth) acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth) acrylamide, or triallyl phthalate and diallyl phthalate, or any combination thereof. Cross-linking agents, as disclosed in the Examples, include, for example, ethylene glycol dimethacrylate (EGDMA), or triethylene glycol dimethacrylate (TEGDMA), or triethylene glycol divinyl ether (TEGDVE), or any combination thereof. In one example, the cross-linking agent can have a molecular weight less than 1500 daltons, or less than 1000 daltons, or less than 500 daltons, or less than 200 daltons.

In one example, the cross-linking agent can be a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, cross-linking agents comprising one or more acrylate or methacrylate polymerizable group (e.g., an acrylate-containing cross-linking agent or a methacrylate-containing cross-linking agent) are not considered to be vinyl-containing cross-linking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof. As used herein, a mixed vinyl-containing cross-linking agent is a cross-linking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

In one example, the cross-linking agent or cross-linking agent component can comprise a vinyl-containing cross-linking agent. For example, the vinyl-containing cross-linking agent or cross-linking agent component can comprise or consist of a vinyl ether-containing cross-linking agent. In another example, the cross-linking agent or cross-linking agent component can comprise or consist of an acrylate-containing cross-linking agent (i.e., a cross-linking agent having at least two acrylate polymerizable functional groups), or a methacrylate-containing cross-linking agent (i.e., at least two methacrylate polymerizable functional groups), or at least one acrylate-containing cross-linking agent and at least one methacrylate-containing cross-linking agent.

The cross-linking agent component can comprise or consist of a combination of two or more cross-linking agents, each of which has a different polymerizable functional group. For example, the cross-linking agent component can comprise one vinyl-containing cross-linking agent, and one acrylate-containing cross-linking agent. The cross-linking agent component can comprise one vinyl-containing cross-linking agent and one methacrylate-containing cross-linking group. The cross-linking agent component can comprise or consist of one vinyl ether-containing cross-linking agent, and one methacrylate-containing cross-linking agent.

Optionally, the polymerizable composition of the present disclosure can comprise or consist of at least one vinyl-containing cross-linking agent or cross-linking agent component, and can be free of a non-silicon vinyl-free cross-linking agent. In other words, in this example, the polymerizable composition comprises the first siloxane monomer, the second siloxane monomer, and at least one cross-linking agent, wherein the at least one cross-linking agent consists of at least one vinyl-containing cross-linking agent (i.e., a single vinyl-containing cross-linking agent or a vinyl-containing cross-linking agent component comprised of two or more vinyl-containing cross-linking agents), as no non-silicone cross-linking agents other than vinyl-containing cross-linking agents are present in the polymerizable composition. In other words, in this example, no non-vinyl cross-linking agents are present in the polymerizable composition.

The optional cross-linking agent or cross-linking agent component can be present in the polymerizable composition in an amount from 0.01 to 10.0 unit parts, such as, for example, from 0.05 to 5.0 unit parts, or from 0.1 to 2.0 unit parts, or from 0.2 to 1.0 unit parts, or from 0.3 to 0.8 unit parts. In one example, when the cross-linking agent or cross-linking agent component comprises a vinyl-containing cross-linking agent, the vinyl-containing cross-linking agent or cross-linking agent component can be present in the polymerizable composition in an amount from 0.01 to 0.80 unit parts, such as, for example, 0.05 to 0.30 unit parts or from 0.1 to 0.2 unit parts. When the at least one cross-linking agent is a acrylate-containing or methacrylate-containing cross-linking agent or cross-linking agent component, the acrylate-containing or methacrylate-containing cross-linking agent or cross-linking agent component can be present in the polymerizable composition in an amount from 0.1 to 2.0 unit parts, such as, for example, 0.3 to 1.2 unit parts or from 0.5 to 0.8 unit parts. When a combination of a vinyl-containing cross-linking agent or cross-linking agent component, and an acrylate-containing or methacrylate-containing cross-linking agent or cross-linking agent component is used, the vinyl-containing cross-linking agent or cross-linking agent component and the acrylate-containing or methacrylate-containing cross-linking agent or cross-linking agent component can be present in the polymerizable composition in a ratio from 1:2 to 1:20, or from 1:3 to 1:12, or from 1:4 to 1:7 based on the ratio by weight of the unit parts of the vinyl-containing cross-linking agent or cross-linking agent component to the unit parts of the acrylate-containing or methacrylate-containing cross-linking agent or cross-linking component.

While in some polymerizable compositions limiting the amount of vinyl-containing cross-linking agent can improve wettability, in many cases, the inclusion of a vinyl-containing cross-linking agent in the polymerizable composition can also improve the dimensional stability of the resulting contact lens formed from the polymerizable composition. Thus, in some polymerizable compositions, a vinyl-containing cross-linking agent can be present in the polymerizable in an amount effective to produce a contact lens having improved dimensional stability as compared to a contact lens produced from the same polymerizable composition but without the vinyl-containing cross-linking agent.

Yet another approach for producing contact lenses having ophthalmically acceptably wettable surfaces in accordance with the present disclosure, can be to include an amount of a vinyl-containing cross-linking agent in the polymerizable composition based on the ratio of the unit parts of the hydrophilic vinyl-containing monomer present in the composition to the unit parts of the vinyl-containing cross-linking agent present in the composition. For example, the unit parts of the hydrophilic vinyl-containing monomer and the unit parts of the vinyl-containing cross-linking agent can be present in the polymerizable composition in a ratio greater than about 125:1, or from about 150:1 to about 625:1, or from about 200:1 to about 600:1, or from about 250:1 to about 500:1, or from about 450:1 to about 500:1, based on the ratio of the unit parts of the hydrophilic vinyl-containing monomer to the unit parts of the vinyl-containing cross-linking agent.

The polymerizable composition can optionally include one or more organic diluents, one or more polymerization initiators (i.e., ultraviolet (UV) initiators or thermal initiators, or both), or one or more UV absorbing agents, or one or more tinting agents, or one or more oxygen scavengers, or one or more chain transfer agents, or any combination thereof. These optional ingredients can be reactive or non-reactive ingredients. In at least one example, the polymerizable compositions can be diluent-free in that they do not contain any organic diluent to achieve miscibility between the siloxanes and the other lens forming ingredients, such as the optional hydrophilic monomers, hydrophobic monomer, and cross-linking agents. In addition, many of the present polymerizable compositions are essentially free of water (e.g., contain no more than 3.0% or 2.0% water by weight).

The polymerizable compositions disclosed herein can optionally comprise one or more organic diluents, i.e., the polymerizable composition can comprise an organic diluent, or can comprise an organic diluent component comprising two or more organic diluents. Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts.

Approaches commonly employed to increase the miscibility of siloxane monomers and hydrophilic monomers include adding organic diluents to the polymerizable composition to act as compatiblizers between the hydrophilic monomers and the siloxane monomers which typically are more hydrophobic, or using only siloxane monomers having low molecular weights (e.g., molecular weights below 2500 daltons). The use of the first siloxane as described above makes it possible to include both a high molecular weight second siloxane and a high level of one or more hydrophilic monomers in the polymerizable compositions of the present disclosure. And while it is possible to include one or more organic diluents in the present polymerizable compositions disclosed herein, it may not be necessary to do so in order to obtain a miscible polymerizable composition in accordance with the present disclosure. In other words, in at least one example, the silicone hydrogel contact lenses of the present disclosure are formed from polymerizable compositions which are free of an organic diluent.

An example of the disclosed polymerizable composition can be miscible when initially prepared, and can remain miscible over a period of time adequate for the commercial manufacture of contact lenses, such as, for example, 2 weeks, or 1 week, or 5 days. Typically, when polymerized and processed into contact lenses, miscible polymerizable compositions result in contact lenses having ophthalmically acceptable clarities.

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl) phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of the Examples disclosed herein, the UV absorbing agent is 2-(4-Benzoyl-3-hydroxyphenoxy)ethyl acrylate (UV-416) or 2-(3-(2H-benzotriazol-2-YL)-4-hydroxy-phenyl)ethyl methacrylate (NORBLOC® 7966 from Noramco, Athens, Ga., USA). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. Tinting agents can include, for example, VAT Blue 6 (7,16-Dichloro-6,15-dihydroanthrazine-5,9,14,18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4-[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis (2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-274, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of the Examples disclosed herein, the tinting agent is a reactive blue dye, such as those described in U.S. Pat. No. 4,997,897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

The polymerizable compositions of the present disclosure can optionally comprise at least one oxygen scavenger, i.e., one oxygen scavenger or an oxygen scavenger component comprising two or more oxygen scavengers. Examples of oxygen scavengers which can be included as the oxygen scavenger or oxygen scavenger component of the present polymerizable compositions include, for example, Vitamin E, or phenolic compounds, or phosphite compounds, or phosphine compounds, or amine oxide compounds, or any combination thereof. For example, the oxygen scavenger or oxygen scavenger component can consist of or comprise a phosphine-containing compound. In many of the Examples disclosed herein, the oxygen scavenger or oxygen scavenger component is a phosphine-containing compound, such as triphenyl phosphine, or a polymerizable form of triphenyl phosphine, such as diphenyl(P-vinylphenyl)phosphine.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of the Examples disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

In one example, the silicone hydrogel contact lenses of the present disclosure can have relatively high equilibrium water contents (EWC)s. Methods of determining EWC are known to those of ordinary skill in the art, and can be based on weight loss from a lens during a drying process. For example, the silicone hydrogel contact lenses can have, when fully hydrated, an equilibrium water content from 20% to 75% by weight. The present contact lenses can have an EWC from about 30% to about 70%, or from about 45% to about 65%, or from about 50% to about 63%, or from about 50% to about 67%, or from about 55% to about 65% by weight.

The present contact lenses can have an oxygen permeability (or Dk) of at least 55 barrers (Dk≥55 barrers), or an oxygen permeability of at least 60 barrers (Dk≥60 barrers), or an oxygen permeability of at least 65 barrers (Dk≥65 barrers). The lenses can have an oxygen permeability from about 55 barrers to about 135 barrers, or from about 60 barrers to about 120 barrers, or from about 65 barrers to about 90 barrers, or from about 50 barrers to about 75 barrers. Various methods of determining oxygen permeability are known to those of ordinary skill in the art.

The silicone hydrogel contact lenses of the present disclosure have, when fully hydrated, an average tensile modulus about 0.20 MPa to about 0.90 MPa. For example, the average modulus can be from about 0.30 MPa to about 0.80 MPa, or from about 0.40 MPa to about 0.75 MPa, or from about 0.50 MPa to about 0.70 MPa.

As used herein, the modulus of a contact lens or lens body is understood to refer to the tensile modulus, also known as Young's modulus. It is a measure of the stiffness of an elastic material. The tensile modulus can be measured using a method in accordance with ANSI Z80.20 standard. In one example, the tensile modulus can be measured using an Instron Model 3342 or Model 3343 mechanical testing system.

The present contact lenses can have an oxygen permeability of at least 55 barrers (Dk≥55 barrers), or an EWC from about 30% to about 70%, or a tensile modulus from about 0.2 MPa to about 0.9 MPa, or any combination thereof. In one example, the contact lenses can have an oxygen permeability of at least 60 barrers (Dk≥60 barrers), or an EWC from about 35% to about 65%, or a tensile modulus from about 0.3 MPa to about 0.8 MPa, or any combination thereof. In another example, the present contact lenses can have an oxygen permeability of at least 60 barrers, or an EWC from about 45% to about 65%, or a tensile modulus from about 0.40 MPa to about 0.75 MPa, or any combination thereof.

In one example, the present contact lenses have an oxygen permeability of at least 55 barrers, an EWC from about 30% to about 70%, and a tensile modulus from about 0.2 MPa to about 0.9 MPa.

The silicone hydrogel contact lenses of the present disclosure can have, when fully hydrated, an average percentage of energy loss from about 25% to about 40%. For example, the average percentage of energy loss can be from about 27% to about 40%, or can be from about 30% to about 37%.

As used herein, percentage of energy loss is a measure of the energy lost as heat when energy loading and unloading cycles are applied to viscoelastic materials. Percentage of energy loss can be determined using a number of methods known to those of ordinary skill in the art. For example, the force involved in stretching a sample to 100% strain, and then returning it to 0% at a constant rate can be determined and used to calculate the percentage energy loss for the material.

The present contact lenses can have an ionoflux less than about $8.0 \times 10^{-3}$ mm$^2$/min, or less than about $7.0 \times 10^{-3}$ mm$^2$/min, or less than about $5.0 \times 10^{-3}$ mm$^2$/min. Various methods of determining ionoflux are conventional and are known to those of ordinary skill in the art.

Silicone hydrogel contact lenses of the present invention can have captive bubble dynamic advancing contact angles of less than 120 degrees, such as, for example, less than 90 degrees when fully hydrated, less than 80 degrees when fully hydrated, less than 70 degrees when fully hydrated, or less than 65 degrees when fully hydrated, or less than 60 degrees when fully hydrated, or less than 50 degrees when fully hydrated.

Silicone hydrogel contact lenses of the present invention can have captive bubble static contact angles of less than 70 degrees when fully hydrated, or less than 60 degrees when fully hydrated, or less than 55 degrees when fully hydrated, or less than 50 degrees when fully hydrated, or less than 45 degrees when fully hydrated.

In one example, the present contact lenses can have a wet extractable component. The wet extractable component is determined based on the weight lost during methanol extraction of contact lenses which have been fully hydrated and sterilized prior to drying and extraction testing. The wet extractable component can comprise unreacted or partially reacted polymerizable ingredients of the polymerizable composition. As the wet extractable component consists of extractable materials remaining in the lens body after the lens body has been fully processed to form a sterilized contact lens, for lenses formed from polymerizable compositions comprising non-reactive ingredients, it can be assumed that substantially all of the non-reactive ingredients have been removed from the lens body during its processing, and so the wet extractable component consists essentially of extractable components formed from reactive ingredients of the polymerizable composition, i.e., unreacted polymerizable components and partially reacted polymerizable ingredients. In lenses made from a polymerizable composition free of a diluent, the wet extractable component can be present in the contact lens in an amount from about 1% wt/wt to about 15% wt/wt, or from about 2% wt/wt to about 10% wt/wt, or from about 3% wt/wt to about 8% wt/wt based on the dry weight of the lens body prior to extraction testing. In lenses made from a polymerizable composition comprising a diluent, the wet extractable component may consist of a portion of the diluent as well as unreacted and partially reacted polymerizable ingredients, and can be present in the contact lens in an amount from about 1% wt/wt to about 20% wt/wt, or from about 2% wt/wt to about 15% wt/wt of the lens, or from about 3% wt/wt to about 10% wt/wt based on the dry weight of the lens body prior to extraction testing.

In one example, the present contact lenses have a dry extractable component. The dry extractable component is determined based on the weight lost during extraction in methanol of polymeric lens bodies which have not been washed, extracted (as part of a manufacturing process), hydrated or sterilized prior to the drying and extraction testing. The dry extractable component can comprise unreacted or partially reacted polymerizable ingredients of the polymerizable composition. When optional non-reactive ingredients such as diluents and the like are present in the polymerizable composition, the dry extractable component may further comprise the non-reactive ingredients.

In lenses made from a polymerizable composition free of a diluent, the dry extractable component of the lens consists primarily of dry extractable components contributed by polymerizable ingredients of the polymerizable composition (i.e., unreacted or partially reacted polymerizable ingredients), and may also include dry extractable materials contributed by optional non-polymerizable components present in the polymerizable composition in small amounts (e.g., less than 3% wt/wt), such as, for example, initiators, tinting agents, oxygen scavengers, and the like. In lenses made from a polymerizable composition free of a diluent, the dry extractable component can be present in the polymeric lens body in an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

In lenses made from a polymerizable composition comprising a large amount (e.g., more than 3% wt/wt) of an optional non-reactive ingredient such as a diluent, the dry extractable component consists of extractable materials contributed by reactive ingredients as well as extractable components contributed by non-polymerizable ingredients of the polymerizable composition. The total amount of dry extractable components contributed by reactive ingredients and non-polymerizable ingredients present in the contact lens can consist of an amount from about 1% wt/wt to about 75% wt/wt, or from about 2% wt/wt to about 50% wt/wt of the lens, or from about 3% wt/wt to about 40% wt/wt, or from about 4% wt/wt to about 20% wt/wt, or from about 5% to about 10% based on the dry weight of the polymeric lens body prior to extraction testing. The total amount of dry extractable components contributed by polymerizable ingredients (i.e., unreacted or partially reacted polymerizable ingredients) can be an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

The contact lenses of the present disclosure, as they are configured to be placed or disposed on a cornea of an animal or human eye, are ophthalmically acceptable contact lenses. As used herein, an ophthalmically acceptable contact lens is understood to be a contact lens having at least one of a number of different properties as described below. An ophthalmically acceptable contact lens can be formed of, and packaged in, ophthalmically acceptable ingredients such that the lens is not cytotoxic and does not release irritating and/or toxic ingredients during wear. An ophthalmically acceptable contact lens can have a level of clarity in the optic zone of the lens (i.e., the portion of the lens providing vision correction) sufficient for its intended use in contact with the cornea of an eye, for example, a transmittance of at least 80%, or at least 90%, or at least 95% of visible light. An ophthalmically acceptable contact lens can have sufficient mechanical properties to facilitate lens handling and care for a duration of time based on its intended lifetime. For example, its modulus, tensile strength, and elongation can be sufficient to withstand insertion, wear, removal and, optionally, cleaning over the intended lifetime of the lens. The level of these properties which are appropriate will vary depending upon the intended lifetime and usage of the lens (e.g., single use daily disposable, multiple use monthly, etc). An ophthalmically acceptable contact lens can have an effective or appropriate ionoflux to substantially inhibit or substantially prevent corneal staining, such as corneal staining more severe than superficial or moderate corneal staining after continuous wear of the lens on a cornea for 8 or more hours. An ophthalmically acceptable contact lens can have a level of oxygen permeability sufficient to allow oxygen to reach the cornea of an eye wearing the lens in an amount sufficient for long term corneal health. An ophthalmically acceptable contact lens can be a lens which does not cause substantial or undue corneal swelling in an eye wearing the lens, for example, no more than about 5% or 10% corneal swelling after being worn on a cornea of an eye during an overnight sleep. An ophthalmically acceptable contact lens can be a lens which allows movement of the lens on the cornea of an eye wearing the lens sufficient to facilitate tear flow between the lens and the eye, in other words, does not cause the lens to adhere to the eye with sufficient force to prevent normal lens movement, and that has a low enough level of movement on the eye to allow vision correction. An ophthalmically acceptable contact lens can be a lens which allows wearing of the lens on the eye without undue or significant discomfort and/or irritation and/or pain. An ophthalmically acceptable contact lens can be a lens which inhibits or substantially prevents lipid and/or protein deposition sufficient to cause the lens wearer to remove the lens because of such deposits. An ophthalmically acceptable contact lens can have at least one of a water content, or a surface wettability, or a modulus or a design, or any combination thereof, that is effective to facilitate ophthalmically compatible wearing of the contact lens by a contact lens wearer at least for one day. Ophthalmically compatible wearing is understood to refer to the wearing of a lens by a lens wearer with little or no discomfort, and with little or no occurrence of corneal staining. Determining whether a contact lens is ophthalmically acceptable can be achieved using conventional clinical methods, such as those performed by an eye care practitioner, and as understood by persons of ordinary skill in the art.

The present contact lenses have ophthalmically acceptably wettable lens surfaces. For example, the contact lenses can have the ophthalmically acceptably wettable lens surfaces when the polymerizable composition used to form the polymeric lens body is free of an internal wetting agent, or when the polymerizable composition used to form the polymeric lens body is free of an organic diluent, or when the polymeric lens body is extracted in water or an aqueous solution free of a volatile organic solvent, or when the polymeric lens body is free of a surface plasma treatment, or any combination thereof.

One approach commonly used in the art to increase the wettability of contact lens surfaces is to apply treatments to the lens surfaces or to modify the lens surfaces. In accordance with the present disclosure, the silicone hydrogel contact lenses can have ophthalmically acceptably wettable lens surfaces without the presence of a surface treatment or surface modification. Surface treatments include, for example, plasma and corona treatments which increase the hydrophilicity of the lens surface. While it is possible to apply one or more surface plasma treatments to the present lens bodies, it is not necessary to do so in order to obtain a silicone hydrogel contact lens having ophthalmically acceptably wettable lens surfaces when fully hydrated. In other words, in one example, the silicone hydrogel contact lenses of the present disclosure can be can be free of a surface plasma or corona treatment.

Surface modifications include binding wetting agents to the lens surface, such as, for example, binding a wetting agent such as a hydrophilic polymer to at least a lens surface by chemical bonding or another form of chemical interaction. In some cases, the wetting agent may be bound to the lens surface as well as a least a portion of the polymeric matrix of the lens, i.e., at least a portion of the bulk of the lens, by chemical bonding or another form of chemical interaction. The ophthalmically acceptably wettable lens surfaces of the present disclosure can be ophthalmically acceptably wettable without the presence of a wetting agent (e.g., a polymeric material or a non-polymeric material) bound to at least the lens surface. While it is possible to bind one or more wetting agents to the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, bound to a surface of the lens. Alternatively, in another example, the silicone hydrogel contact lenses of the present disclosure can be free of a wetting agent bound to the lens surface.

Another method of increasing lens wettability is to physically entrap a wetting agent within the lens body or contact lens, such as by introducing the wetting agent into the lens body when the lens body is swollen, and then returning the lens body to a less swollen state, thereby entrapping a portion of a wetting agent within the lens body. The wetting agent can be permanently trapped within the lens body, or can be released from the lens over time, such as during wear. The ophthalmically acceptably wettable lens surfaces of the present disclosure can be ophthalmically acceptably wettable without the presence of a wetting agent (e.g., a polymeric material or a non-polymeric material) physically entrapped in the lens body following formation of the polymeric lens body. While it is possible to physically entrap one or more wetting agents in the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, entrapped within the lenses. Alternatively, the silicone hydrogel contact lenses of the present disclosure can be free of a wetting agent physically entrapped within the lens. As used herein, physically entrapped refers to immobilizing a wetting agent, or other ingredient, in the polymeric matrix of the lens with little or no chemical bonding or chemical interaction being present between the wetting agent and or other ingredient and the polymeric matrix. This is in contrast to ingredients that are chemically bound to the polymeric matrix, such as by ionic bonds, covalent bonds, van der Waals forces, and the like.

Another approach commonly used in the art to increase the wettability of silicone hydrogel contact lenses includes adding one or more wetting agents to the polymerizable composition. In one example, the wetting agent can be a polymeric wetting agent. However, the contact lenses of the present disclosure can have ophthalmically acceptably wettable lens surfaces when the polymerizable composition used to form the polymeric lens body is free of a wetting agent. While it is possible to include one or more wetting agents in the present polymerizable compositions to increase the wettability of the silicone hydrogel contact lenses of the present disclosure, it is not necessary to do so in order to obtain a silicone hydrogel contact lens having ophthalmically acceptably wettable lens surfaces. In other words, in one example, the silicone hydrogel contact lenses of the present disclosure can be formed from polymerizable compositions free of wetting agents. Alternatively, in another example, the polymerizable compositions of the present invention can further comprise a wetting agent.

In one example, the wetting agent can be an internal wetting agent. The internal wetting agent can be bound within at least a portion of the polymeric matrix of the lens. For example, the internal wetting agent can be bound within at least a portion of the polymeric matrix of the lens by chemical bonding or another form of chemical interaction. In some cases, the wetting agent may be bound to the lens surface as well. The internal wetting agent can comprise a polymeric material or a non-polymeric material. While it is possible to bind one or more internal wetting agents within the polymeric matrix of the present lenses, it is not necessary to do so in order to obtain a silicone hydrogel contact lens having ophthalmically acceptably wettable lens surfaces when fully hydrated. Thus, in one example, the lenses of the present disclosure can comprise internal wetting agents bound to at least a portion of the polymeric matrix of the lens. Alternatively, in another example, the silicone hydrogel contact lenses of the present disclosure can be free of an internal wetting agent bound to at least a portion of the polymeric matrix of the lens.

In another example, the wetting agent can be an internal polymeric wetting agent. The internal polymeric wetting agent can be present in the polymeric lens body as part of an interpenetrating polymer network (IPN) or a semi-IPN. An interpenetrating polymer network is formed by at least two polymers, each of which is crosslinked to itself, but none of which are crosslinked to each other. Similarly, a semi-IPN is formed by at least two polymers, at least one of which is crosslinked to itself but not to the other polymer, and the other of which is not crosslinked either to itself or the other polymer. In one example of the present disclosure, the contact lens can have ophthalmically acceptably wettable lens surfaces when the polymeric lens body is free of an internal polymeric wetting agent present in the lens body as an IPN or a semi-IPN. Alternatively, the contact lens can comprise an internal polymeric wetting agent present in the lens body as an IPN or a semi-IPN.

In yet another example, the wetting agent can be a linking compound present in the polymerizable composition used to form the lens body, or a linking agent physically entrapped within the polymeric lens body after the lens body has been formed. When the wetting agent is a linking compound, after polymerization of the lens body or entrapment of the linking agent in the polymeric lens body, the linking compound can subsequently link a second wetting agent to the lens body when the lens body is contacted by the wetting agent. The linking can occur as part of the manufacturing process, for example as a washing process, or can take place when the lens body is contacted by a packaging solution. The linking can take the form of an ionic bond, or a covalent bond, or a form of van der Waals attraction. The linking agent can comprise a boronic acid moiety or group such that a polymerized boronic acid moiety or group is present in the polymeric lens body, or such that a boronic acid moiety or group is physically entrapped in the polymeric lens body. For example, when the linking agent comprises a form of boronic acid, the second wetting agent can comprise a form of poly(vinyl alcohol) which becomes bound to the form of boronic acid. Optionally, silicone hydrogel contact lenses of the present disclosure can be understood to be free of linking agents. In one example, the silicone hydrogel contact lenses can be free of boronic acid moieties or groups, including polymerized boronic acid moieties or groups, that is, specifically, the silicone hydrogel contact lenses can be formed from a polymerizable composition free of a form of boronic acid such as, for example, a polymerizable form of boronic acid including vinyl phenyl boronic acid (VPB), can be formed of a polymer free of units derived from a polymerizable form of boronic acid such as vinyl phenyl boronic acid (VPB), and the polymeric lens body and the silicone hydrogel contact lenses can be free of a form of boronic acid, including polymeric or non-polymeric form of boronic acid, physically entrapped therein. Alternatively, the polymerizable composition, or the polymeric lens body, or the silicone hydrogel contact lens, or any combination thereof, can comprise at least one linking agent.

The silicone hydrogel contact lenses of the present disclosure have not been exposed to a volatile organic solvent or a solution of a volatile organic solvent as part of a manufacturing process. In one example, the silicone hydrogel contact lenses of the present disclosure can be formed from a polymerizable composition free of a wetting agent, or the polymeric lens body and/or hydrated contact lens can be free of a wetting agent, or free of surface treatment, or free of a surface modification, or was not exposed to a volatile organic solvent or a solution of a volatile organic solvent during the manufacturing process, or any combination thereof. Instead, for example, the silicone hydrogel contact lenses can be extracted in water or an aqueous solution free of a volatile organic solvent, such as, for example, free of a volatile lower alcohol.

The use of volatile organic solvents to extract lens bodies contributes significantly to production costs, due to factors such as the cost of the organic solvents, the cost of disposal of the solvents, the need to employ explosion-proof production equipment, the need to remove the solvents from the lenses prior to packaging, and the like. However, development of polymerizable compositions capable of consistently producing contact lenses with ophthalmically acceptably wettable lens surfaces when extracted in aqueous liquids free of volatile organic solvents can be challenging. For example, it is common to find non-wetting regions present on the lens surfaces of contact lenses which have been extracted in aqueous liquids free of volatile organic solvents, as discussed herein.

As previously discussed, the contact lenses disclosed herein are contact lenses which have not been exposed to a volatile organic solvent, such as a lower alcohol, during their manufacture. In other words, the extraction liquids used for such lenses, as well as all liquids used during wet demolding, or wet delensing, or washing, or any other manufacturing step, are all free of volatile organic solvents. In one example, the polymerizable composition used to form these entirely aqueous liquid extracted lenses can comprise a hydrophilic vinyl-containing monomer or monomer component, such as, for example, a hydrophilic vinyl ether-containing monomer. The vinyl-containing hydrophilic monomer or monomer component can include, for example, VMA. The vinyl ether-containing monomers can include, for example, BVE, or EGVE, or DEGVE, or any combination thereof. In one particular example, the vinyl ether-containing monomer can be a vinyl ether-containing monomer which is more hydrophilic than BVE, such as, for example, DEGVE. In another example, the hydrophilic monomer component of the polymerizable composition can be a mixture of a first hydrophilic monomer which is a vinyl-containing monomer but which is not a vinyl ether-containing monomer, and a second hydrophilic monomer which is a vinyl ether-containing monomer. Such mixtures include, for example, mixtures of VMA and one or more vinyl ethers such as, for example, BVE, or DEGVE, or EGVE, or any combination thereof.

When present, the hydrophilic vinyl ether-containing monomer or monomer component can be present in the polymerizable composition in an amount from about 1 to about 15 unit parts, or from about 3 to about 10 unit parts. When present as a mixture with a hydrophilic vinyl-containing monomer which is not a vinyl ether, the portion of the hydrophilic vinyl-containing monomer or monomer component which is not a vinyl ether and the hydrophilic vinyl ether-containing monomer or monomer component can be present in the polymerizable composition at a ratio of at least 3:1, or from about 3:1 to about 15:1, or of about 4:1 based on the ratio of the unit parts by weight of the hydrophilic vinyl-containing monomer or monomer component which is not a vinyl ether to the unit parts by weight of the hydrophilic vinyl ether-containing monomer or monomer component.

Another approach for producing contact lenses having ophthalmically acceptably wettable lens surfaces in accordance with the present disclosure, particularly lenses extracted in a liquid free of a volatile organic solvent, can be to limit the amount of a vinyl-containing cross-linking agent or cross-linking agent component included in the polymerizable composition. For example, a vinyl-containing cross-linking agent or cross-linking agent component can be present in the polymerizable composition in an amount from about 0.01 to about 0.80 unit parts, or from 0.05 to about 0.30 unit parts, or from about 0.05 to about 0.20 unit parts, or in an amount of about 0.1 unit parts. In one example, a vinyl-containing cross-linking agent or cross-linking agent component can be present in the polymerizable composition in an amount effective to produce a contact lens having improved wettability as compared to a contact lens produced from the same polymerizable composition but having an amount of the vinyl-containing cross-linking agent or cross-linking agent component greater than about 2.0 unit parts, or greater than 1.0 unit parts, or greater than about 0.8 unit parts, or greater than about 0.5 unit parts, or greater than about 0.3 unit parts.

Certain specific examples of silicone hydrogel contact lenses will now be described, in accordance with the present teachings.

As one example (example A), a silicone hydrogel contact lens comprises a polymeric lens body that is the reaction product of a polymerizable composition comprising a first monofunctional siloxane monomer, such as the siloxane monomer represented by formula (1), wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; a second siloxane monomer having more than one polymerizable functional group and that has a number average molecular weight of at least 3,000 daltons; and a hydrophilic amide monomer or monomer component having one N-vinyl group, specifically the hydrophilic monomer comprises or consists of N-vinyl-N-methyl acetamide (VMA), wherein the first siloxane monomer and second siloxane monomer are present in the composition at a ratio of 2:1 based on unit parts by weight.

One example of a method of manufacturing a batch of silicone hydrogel contact lenses of the present disclosure is a method comprising: providing polymerized silicone hydrogel contact lens bodies in contact lens mold assemblies, the polymerized silicone hydrogel contact lens bodies being the reaction product of a polymerizable composition comprising a first monofunctional siloxane monomer, a second siloxane monomer having more than one polymerizable functional group and that has a number average molecular weight of at least 3,000 daltons, and a hydrophilic amide monomer or monomer component having one N-vinyl group, the first siloxane monomer and second siloxane monomer are present in the composition at a ratio of 2:1 based on unit parts by weight, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together; separating the polymerized silicone hydrogel contact lens bodies from the contact lens mold assemblies to produce delensed contact lens bodies; washing the delensed contact lens bodies with an aqueous liquid free of volatile organic solvent to produce washed contact lenses; and sterilizing the washed contact lenses in sealed contact lens packages; wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6x to about 70x. In one example, the at least one hydrophilic vinyl-containing monomer or monomer component can comprise a hydrophilic amide monomer having one N-vinyl group can comprise N-vinyl-N-methyl acetamide (VMA), or the first siloxane monomer can comprise a siloxane monomer represented by formula (1) as discussed above, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

One example of a batch of silicone hydrogel contact lenses in accordance with the present disclosure is a batch comprising: at least twenty polymerized silicone hydrogel contact lenses, the polymerized silicone hydrogel contact lenses being the reaction product of a polymerizable composition comprising a first monofunctional siloxane monomer, a second siloxane monomer having more than one polymerizable functional group and that has a number average molecular weight of at least 3,000 daltons, and a hydrophilic amide monomer or monomer component having one N-vinyl group, the first siloxane monomer and second siloxane monomer are present in the composition at a ratio of 2:1 based on unit parts by weight, each silicone hydrogel contact lens of the batch being an aqueous extracted silicone hydrogel contact lens comprising an anterior surface and an opposing posterior surface, the posterior surface dimensioned (sized and shaped) for placement against a subject's eye; the anterior surface of each of the aqueous extracted contact lenses having a clinically acceptable surface wettability, such that less than five percent of the batch of silicone hydrogel contact lenses has visually identifiable non-wetting spots when located on eyes of subject; wherein the non-wetting spots are discontinuities of the contact lens wearer's pre-lens tear film present on the anterior surface of the lens body, and are visually identifiable during a slit lamp examination at a total magnification from about 6x to about 70x. In one example, the at least one hydrophilic vinyl-containing monomer or monomer component can comprise a hydrophilic amide monomer having one N-vinyl group can comprise N-vinyl-N-methyl acetamide (VMA), or the first siloxane monomer can comprise a siloxane monomer represented by formula (1) as discussed above, or both. In another example, the polymerizable composition can be free of a diluent, or free of a hydrophilic polymer, or free of N,N-dimethylacrylamide (DMA), or any combination thereof. In yet another example, the silicone hydrogel contact lens can be free of a plasma surface treatment or of a polymeric internal wetting agent provided by including a hydrophilic polymer in a polymerizable composition used to form the silicone hydrogel contact lens, or both.

As a second example (example B), a silicone hydrogel contact lens comprises a polymeric lens body that is the reaction product of a polymerizable composition as described in example A, and wherein the polymerizable composition further comprises a hydrophobic monomer or monomer component, specifically the hydrophilic monomer comprises or consists of methyl methacrylate (MMA).

As a third example (example C), a silicone hydrogel contact lens comprises a polymeric lens body that is the reaction product of a polymerizable composition as described in example A or B, and wherein the polymerizable composition further comprises a vinyl ether-containing cross-linking agent or cross-linking agent component, specifically the cross-linking agent or cross-linking agent component comprises or consists of triethylene glycol divinyl ether (TEGVE).

As a fourth example (example D), a silicone hydrogel contact lens comprises a polymeric lens body that is the reaction product of a polymerizable composition as described in example A or B or C, and wherein the polymerizable composition further comprises a thermal initiator or thermal initiator component.

As a fifth example (example E), a silicone hydrogel contact lens comprises a polymeric lens body that is the reaction product of a polymerizable composition as described in example A or B or C or D, and wherein the polymerizable composition further comprises an oxygen scavenger or oxygen scavenger component.

As a sixth example (example F), a silicone hydrogel contact lens comprises a polymeric lens body that is the reaction product of a polymerizable composition as described in example A or B or C or D or E, and wherein the polymerizable composition further comprises a UV blocker or UV blocker component.

As a seventh example (example G), a silicone hydrogel contact lens comprises a polymeric lens body that is the reaction product of a polymerizable composition as described in example A or B or C or D or E or F, and wherein the polymerizable composition further comprises a tinting agent or tinting agent component.

As an eighth example (example H), a silicone hydrogel contact lens comprises a polymeric lens body that is the reaction product of a polymerizable composition as described in example A or B or C or D or E or F or G, and wherein the second siloxane monomer is represented by formula (2), wherein $R_1$ of formula (2) is selected from either hydrogen atom or a methyl group; $R_2$ of formula (2) is selected from either of hydrogen or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. As one example, the second siloxane monomer can be represented by formula (2), wherein m of formula (2) is 0, n of formula (2) is one integer from 5 to 10, a is one integer from 65 to 90, b is one integer from 1 to 10, $R_1$ of formula (2) is a methyl group, and $R_2$ of formula (2) is either a hydrogen atom or a hydrocarbon group having 1 to 4 carbon atoms.

As a ninth example (example I), a silicone hydrogel contact lens comprises a polymeric lens body that is the reaction product of a polymerizable composition as described in example A or B or C or D or E or F or G or H, and wherein the polymerizable composition further comprises a methacrylate-containing cross-linking agent or cross-linking agent component, specifically the cross-linking agent or agent component comprises or consists of ethylene glycol dimethacrylate (EGDMA). In this example, when the polymerizable composition also comprises a vinyl ether-containing cross-linking agent as part of the cross-linking agent component, specifically the cross-linking agent component can comprise or consist of triethylene glycol divinyl ether (TGDVE) in combination with a methacrylate-containing cross-linking agent, which can specifically comprise or consist of ethylene glycol dimethacrylate (EGDMA). In this example, it can be appreciated that the polymerizable composition comprises two cross-linking agents, each having different reactivity ratios, i.e., the polymerizable composition comprises a cross-linking agent component comprising or consisting of a vinyl-containing cross-linking agent and a methacrylate-containing cross-linking agent, the methacrylate-containing cross-linking agent having polymerizable functional groups which are more reactive and which thus react at a faster rate than the vinyl polymerizable functional groups present in the vinyl-containing cross-linking agent.

As a tenth example (example J), a silicone hydrogel contact lens comprises a polymeric lens body that is the reaction product of a polymerizable composition as described in example A or B or C or D or E or F or G or H or I, and wherein the polymerizable composition further comprises a chain transfer agent or chain transfer agent component which can specifically comprise or consist of allyloxy ethanol (AE).

As an eleventh example (example K), a silicone hydrogel contact lens comprises a polymeric lens body that is the reaction product of a polymerizable composition as described in example A or B or C or D or E or F or G or H or I or J, and wherein the polymerizable composition further comprises a hydrophobic monomer or hydrophobic monomer component which can specifically comprise or consist of ethylene glycol methyl ether methacrylate (EGMA).

As a twelfth example (example L), a silicone hydrogel contact lens comprises a polymeric lens body that is the reaction product of a polymerizable composition as described in example A or B or C or D or E or F or G or H or I or J or K, and wherein the polymerizable composition further comprises a hydrophilic vinyl ether-containing monomer or monomer component, for example, the hydrophilic vinyl ether-containing monomer or monomer component can comprise or consist of 1,4-butanediol vinyl ether (BVE), or ethylene glycol vinyl ether (EGVE), or diethylene glycol vinyl ether (DEGVE), or any combination thereof.

In any or each of the foregoing examples A-L, as well as any or all other examples disclosed herein, the amount of the first siloxane monomer can be from 20 to 45 unit parts of the polymerizable composition. The amount of the first siloxane monomer can be from 25 to 40 unit parts of the polymerizable composition. The amount of the first siloxane monomer can be from 27 to 35 unit parts of the polymerizable composition.

In any or each of the foregoing examples A-L, as well as any or all other examples disclosed herein, the amount of the second siloxane monomer can be from 1 to 20 unit parts of the polymerizable composition, as long as the ratio of 2:1 based on unit parts by weight of the first siloxane to the second siloxane is maintained. The amount of the second siloxane monomer can be from 2 to 15 unit parts of the polymerizable composition. The amount of the second siloxane monomer can be from 5 to 13 unit parts of the polymerizable composition.

In any or each of the foregoing examples A-L, as well as any or all other examples disclosed herein, the amount of the hydrophilic monomer or monomer component present in the polymerizable composition can be from 1 to 60 unit parts of the polymerizable composition. The hydrophilic monomer component can constitute from 4 to 60 unit parts of the polymerizable composition. When the hydrophilic monomer comprises or consists of the VMA, it can be present in an amount from 30 unit parts to 60 unit parts. VMA can be present in the polymerizable composition in an amount from about 40 unit parts to about 50 unit parts. When the hydrophilic monomers, N,N-dimethylacrylamide (DMA), 2-hydroxyethyl methacrylate (HEMA), or 2-hydroxybutyl methacrylate (HOB), or any combination thereof are present in the polymerizable composition as the hydrophilic monomer in the hydrophilic monomer component, each or all can be present in amounts from about 3 to about 10 unit parts.

In any or each of the foregoing examples A-L as well as any or all other examples disclosed herein, the amount of the hydrophobic monomer or monomer component present in the polymerizable composition can be from 1 to 30 unit parts of the polymerizable composition. For example, the total amount of hydrophobic monomer or monomer component can be from about 5 to about 20 unit parts of the polymerizable composition. In polymerizable compositions in which the hydrophobic monomer MMA is present as the hydrophobic monomer or as part of the hydrophobic monomer component, the MMA can be present in an amount from about 5 to about 20 unit parts, or from about 8 to about 15 unit parts.

In any or each of the foregoing examples A-L, as well as any or all other examples disclosed herein, the amount of the cross-linking agent or cross-linking agent component present in the polymerizable composition can be from 0.01 to 4 unit parts of the polymerizable composition. TEGDVE can be present in amounts from 0.01 to 1.0 unit parts. EGDMA can be present in amounts from 0.01 to 1.0 unit parts. TEGDMA can be present in amounts from 0.1 to 2.0 unit parts. Each of these non-silicon cross-linking agents can be present alone or in any combination in the polymerizable composition.

In any or each of the foregoing examples A-L, as well as any or all other examples disclosed herein, when the polymerizable composition contains EGMA, BVE, DEGVE, EGVE, or any combination thereof, they are each present in amounts from 1 unit part to 20 unit parts of the polymerizable composition. EGMA can be present in an amount from about 2 unit parts to about 15 unit parts. BVE can be present in an amount from 1 unit part to about 15 unit parts. BVE can be present in an amount from about 3 unit parts to about 7 unit parts. DEGVE can be present in an amount from 1 unit part to about 15 unit parts. DEGVE can be present in an amount from about 7 unit parts to about 10 unit parts. EGVE can be present in an amount from 1 unit part to about 15 unit parts, or in an amount from about 3 unit parts to about 7 unit parts.

In any or each of the foregoing examples A-L, as well as any or all other examples disclosed herein, the other optional components, such as initiators or initiator component, tinting agents or tinting agent components, UV absorbing agents or UV absorbing agent components, oxygen scavengers or oxygen scavenger components, or chain transfer agents or chain transfer agent components, can each be present in amounts from about 0.01 unit parts to about 3 unit parts. An initiator or initiator component can be present in the polymerizable in an amount from 0.1 unit parts to 1.0 unit parts. When a thermal initiator or thermal initiator component is present, such as Vazo-64, it can be present in an amount from about 0.3 to about 0.5 unit parts. Tinting agents or tinting agent components can be present in amounts from 0.01 unit parts to 1 unit part. When reactive dyes are used as tinting agents or as part of a tinting agent component, such as Reactive Blue 246 or Reactive Blue 247, they can each be present in amounts of about 0.01 unit parts. UV absorbing agents or UV absorbing agent components can be present in amounts from 0.1 unit parts to 2.0 unit parts. For example, the UV absorbing agent UV1 described in the Examples below can be present in an amount from about 0.8 to about 1.0 unit parts, such as 0.9 unit parts; or the UV absorbing agent UV2 described in the Examples below, can be present in an amount from 0.5 unit parts to 2.5 unit parts, such as from about 0.9 unit parts to about 2.1 unit parts. Oxygen scavengers or oxygen scavenger components can be present in amounts from 0.1 unit parts to 1.0 unit parts. As an example, when triphenyl phosphine (TPP) or diphenyl(P-vinylphenyl)phosphine (pTPP) or any combination thereof is used as an oxygen scavenger or oxygen scavenger component in the polymerizable composition, each or the combination can be present in an amount from 0.3 unit parts to 0.7 unit parts, such as about 0.5 unit parts. Chain transfer reagents or chain transfer reagent components can be present in the polymerizable composition in an amount from 0.1 unit parts to 2.0 unit parts, and in many of the Examples below is present in an amount from 0.2 unit parts to 1.6 unit parts. For example, the chain transfer reagent allyloxy ethanol (AE) can be present in an amount from about 0.3 to about 1.4 unit parts.

In any or each of the foregoing examples A-L, as well as any or all other examples disclosed herein, the silicone hydrogel contact lenses can be free of a wetting agent that is present in the polymerizable composition, or in the polymeric lens body, or in the silicone hydrogel contact lens. Similarly, the silicone hydrogel contact lens can have lens surfaces that are free of a surface treatment or a surface modification. However, in another example, the silicone hydrogel contact lens can include at least one wetting agent (i.e., a single wetting agent or two or more wetting agents present as a wetting agent component) in the polymerizable composition, in the polymeric lens body, or in the silicone hydrogel contact lens. The silicone hydrogel contact lens can have treated or modified lens surfaces. In addition or alternatively, any or each of the foregoing examples A-L, as well as any or all other examples of silicone hydrogel contact lenses disclosed herein, the contact lenses can be understood to be free of a linking agent such as, for example, a form of boronic acid.

In another example, new polymerizable compositions are provided, including each and every polymerizable composition described herein in reference to the silicone hydrogel contact lenses and methods. The polymerizable compositions can be diluent-free in that they do not contain an organic solvent, such as alcohols and the like, which can help reduce phase separation of the polymerizable composition. However, such diluent-free polymerizable compositions can still contain one or more chain transfer agents, such as allyloxy ethanol. However, if desired, the polymerizable composition can include a diluent or a diluent component, which can be present in an amount from 1 to 20 unit parts.

As described herein, the present silicone hydrogel contact lenses which comprise polymeric lens bodies that comprise units derived from a first siloxane monomer represented by formula (1) and a second siloxane monomer having more than one polymerizable functional group and having a number average molecular weight of at least 3,000 daltons, such as those represented by formulas (2), (3), or (4), are dimensionally stable. The present disclosure also relates to a batch of silicone hydrogel contact lenses.

As used herein, a batch of silicone hydrogel contact lenses refers to a group of twenty or more silicone hydrogel contact lenses, and frequently, a batch refers to at least 20, or at least 100, or at least 1,000 silicone hydrogel contact lenses. In accordance with the present disclosure, a batch of silicone hydrogel contact lenses comprises at least 20 of any of the silicone hydrogel contact lenses described herein.

When initially tested shortly after manufacturing and then tested again at a later time point, a batch of lenses can exhibit a change in its average physical dimensions. As batches of lenses in accordance with the present disclosure are dimensionally stable, they can exhibit an acceptable level of change in their average physical dimensions. As used herein, dimensional stability variance is understood to refer to a variance in a value of a physical dimension between a value of the physical dimension determined when the batch of lenses is initially tested shortly after its manufacture, and the value of the physical dimension determined when the batch of lenses is tested again at a later time point. The later time point can be, for example, from at least 2 weeks after the initial time point, to up to 7 years after the initial time point. The silicone hydrogel contact lenses of the batch have an average dimensional stability variance of less than plus or minus three percent (±3.0%) based on averaging the lens diameter measurements of a representative number of lenses from the batch, such as, for example, 20 lenses from the batch. For a batch of lenses, an average dimensional stability variance of less than plus or minus three percent (±3.0%), where the average dimensional stability variance is the variance in a value of a physical dimension when measured at an initial time point within one day of a manufacturing date of the batch of lenses, and at a second time point, where the second time point is from two weeks to seven years after the initial time point when the batch is stored at room temperature, or, when the batch is stored at a higher temperature (i.e., under accelerated shelf life testing conditions), the second time point is a time point representative of storage of the batch from two weeks to seven years at room temperature, is considered to be a dimensionally stable batch. In one example, accelerated shelf life testing conditions which are especially useful in determining average dimensional stability variance are for 4 weeks at 70 degrees C., although other periods of time and other temperatures can be used. The average dimensional stability variance is determined by averaging the individual dimensional stability variances for each of the representative lenses using the actual diameters of representative lenses measured initially (Diameter$_{Original}$) and the actual diameters of representative lenses measured following (Diameter$_{Final}$) storage at room temperature or under accelerated shelf life conditions. The representative lenses measured initially and the representative lenses measured following storage can be the same lenses or can be different lenses. As used herein, the average dimensional stability variance is represented as a percent (%). The individual dimensional stability variances are determined using the following equation (A):

$$((\text{Diameter}_{Final} - \text{Diameter}_{Original})/\text{Diameter}_{Original}) \times 100 \quad (A).$$

On average, the diameters of the silicone hydrogel contact lenses of the batch vary by less than three percent in either direction of a target value (±3.0%). As one example, if a contact lens has a target diameter (chord diameter) of 14.20 mm, the present batch of silicone hydrogel contact lenses will have an average diameter (average of the population in the batch) from 13.77 mm to 14.63 mm. In one example, the dimensional stability variance is less than plus or minus two percent (±2.0%). As one example, if a contact lens has a target diameter (chord diameter) of 14.20 mm, the present batch of silicone hydrogel contact lenses will have an average diameter (average of the population in the batch) from 13.92 mm to 14.48 mm. Preferably, the average diameter of the batch of silicone hydrogel contact lenses does not vary by more than plus or minus 0.20 mm from the target diameter, which is commonly from 13.00 mm to 15.00 mm.

In accelerated shelf life studies, the average dimensional stability variance can be determined for contact lenses that were stored for a period of time at an elevated temperature, such as above 40 degrees C., including, for example, 50 degrees C., or 55 degrees C., or 65 degrees C., or 70 degrees C., or 80 degrees C., or 95 degrees C., and the like. Or, the average dimensional stability can be determined for contact lenses that were stored for a period of time at room temperature (e.g., about 20-25 degrees C.).

For accelerated shelf life studies, the following formula can be used to determine the number of months of storage at a particular temperature that are equivalent to storage for a desired length of time at room temperature:

$$\text{Desired shelf life} = [N \times 2^y] + n \quad (B)$$

where

N=number of months of storage under accelerated conditions $2^y$=acceleration factor y=(test temperature−25° C.)/10° C.

n=age of lenses (in months) at start of the study

Based on this equation, the following storage times have been calculated: 6 months of storage at 35 degrees C. is equivalent to 1 year aging at 25 degrees C., 3 months of storage at 45 degrees C. is equivalent to 1 year of aging at 25 degrees C., 3 months of storage at 55 degrees C. is equivalent to 2 years of aging at 25 degrees C., and 3 months of storage at 65 degrees C. is equivalent to 4 years of aging at 25 degrees C.

As discussed herein, the present disclosure also provides methods of manufacturing silicone hydrogel contact lenses. In accordance with the present teachings, some of the present methods comprise providing a polymerizable composition. In some examples of the present methods, the polymerizable composition, or contact lens formulation, comprises a first siloxane monomer represented by formula (1):

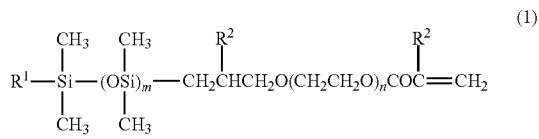

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. The polymerizable composition also comprises a second siloxane monomer having more than one polymerizable functional group and having a number average molecular weight of at least 3,000 daltons. The first siloxane monomer and the second siloxane monomer are present in the polymerizable composition at a ratio of at least 2:1 based on unit parts. The polymerizable composition also comprises at least one hydrophilic monomer, or at least one hydrophobic monomer, or at least one cross-linking agent, or any combination thereof.

The method can also comprise a step of polymerizing the polymerizable composition to form a polymeric contact lens body. The step of polymerizing the polymerizable composition can be conducted in a contact lens mold assembly. The polymerizable composition can be cast molded between molds formed of a thermoplastic polymer. The thermoplastic polymer used to form the molding surfaces of the mold can comprise a polar polymer, or can comprise a non-polar polymer. Alternatively, the polymerizable composition can be formed into a lens via various methods known to those of ordinary skill in the art, such as spin casting, injection molding, forming a polymerized rod that is subsequently lathed to form a lens body, etc.

The method also comprises contacting the polymeric lens body with an aqueous washing liquid to remove extractable material, such as unreacted monomers, uncross-linked materials that are otherwise not physically immobilized in the polymeric contact lens body, diluents, and the like.

In accordance with the present disclosure, the polymeric contact lens body can be packaged along with a contact lens packaging solution in a contact lens package, such as a blister pack or glass vial. Following packaging, the package can be sealed and the polymeric contact lens body and the contact lens packaging solution can be sterilized, for example, by autoclaving the sealed package, to produce a silicone hydrogel contact lens product.

In the present methods, the step of contacting the polymeric contact lens body with a washing liquid can be understood to be an extraction step because extractable materials can be removed from the polymeric contact lens body during the process. In the present methods, the contacting step comprises contacting the polymeric contact lens body with an aqueous washing liquid that is free of a volatile organic solvent. Such methods may be understood to be entirely aqueous washing steps, as no volatile organic solvents are included in the washing liquid. Water-based washing liquids that can be used in such methods include water, such as deionized water, saline solutions, buffered solutions, or aqueous solutions containing surfactants or other non-volatile ingredients that can improve the removal of hydrophobic components from the polymeric contact lens bodies, or can reduce distortion of the polymeric contact lens bodies, compared to the use of deionized water alone.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and can be sealed and sterilized.

EXAMPLES

The following Examples illustrate certain aspects and advantages of the present invention, which should be understood not to be limited thereby.

As can be readily determined by a review of the Examples below, all of the Example formulations are free of an organic diluent. Also, all of the Example formulations are free of N,N-dimethylacrylamide (DMA). Additionally, all of the Example formulations below are free of a polymeric wetting agent. Furthermore, all of the Example formulations comprise at least one hydrophilic amide monomer having one N-vinyl group. A majority of the Example formulations comprise a second siloxane which is a dual-end methacrylate end-capped polydimethylsiloxane having a number average molecular weight of at least 5,000 daltons.

The following chemicals are referred to in Examples C1 and 1-25, and may be referred to by their abbreviations.

Si1: 2-propenoic acid, 2-methyl-, 2-[3-(9-butyl-1,1,3,3,5,5,7,7,9,9-decamethylpentasiloxane-1-yl)propoxy]ethyl ester (CAS number of 1052075-57-6). (Si1 was obtained from Shin-Etsu Chemical Co., Ltd., Tokyo, Japan, as product number X-22-1622).

Si2: α,ω-Bis(methacryloxypropyl)-poly(dimethyl siloxane)-poly(ω-methoxy-poly(ethylenegylcol)propylmethylsiloxane) (the synthesis of this compound can be performed as described in US20090234089, which is incorporated herein by reference)

Si3: Poly(dimethyl siloxane), methacryloxypropyl terminated (CAS number 58130-03-3; DMS-R18 available from Gelest)

VMA: N-vinyl-N-methylacetamide (CAS number 003195786)

DMA: N,N-dimethylacrylamide (CAS number 2680-03-7)

HEMA: 2-hydroxyethyl methacrylate (CAS number 868-77-9)

HOB: 2-hydroxylbutyl methacylate (CAS number 29008-35-3)

EGMA: Ethylene glycol methyl ether methacrylate (CAS number 6976-93-8)

MMA: Methyl methacrylate (CAS number 80-62-6)

EGDMA: Ethylene glycol dimethacrylate (CAS number 97-90-5)

TEGDMA: triethylene glycol dimethacrylate (CAS number 109-16-0)

BVE: 1,4-butanediol vinyl ether (CAS number 17832-28-9)

DEGVE: diethylene glycol vinyl ether (CAS number 929-37-3)

EGVE: ethylene glycol vinyl ether (CAS number 764-48-7)

TEGDVE: triethylene glycol divinyl ether (CAS number 765-12-8)

AE: 2-Allyloxy ethanol (CAS number 111-45-5)

V-64: 2,2'-Azobis-2-methyl propanenitrile (CAS number 78-67-1)

UV1: 2-(4-benzoyl-3-hydroxyphenoxy)ethyl acrylate (CAS number 16432-81-8)

UV2: 2-(3-(2H-benzotriazol-2-YL)-4-hydroxy-phenyl) ethyl methacrylate (CAS number 96478-09-0)

RBT1: 1,4-Bis[4-(2-methacryloxyethyl)phenylamino]anthroquinone (CAS number 121888-69-5)

RBT2: 1,4-Bis[(2-hydroxyethyl)amino]-9,10-anthracene-dione bis(2-propenoic)ester (CAS Reg. No. 109561071)

TPP: Triphenyl phosphine (CAS number 603-35-0)

pTPP: polymerizable TPP: diphenyl(P-vinylphenyl)phosphine (CAS number 40538-11-2)

Silicone Hydrogel Contact Lens Fabrication and Testing Procedure

The chemical compounds set forth in Examples were, for each example, weighed out in amounts corresponding to the described unit parts, and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions. In the Examples, the listed amounts of ingredients are given as unit parts of the polymerizable composition by weight.

A volume of the polymerizable composition was cast molded by placing the composition in contact with a lens defining surface of a female mold member. In all of the following Examples, the molding surface of the female mold member was formed of a non-polar resin, specifically polypropylene, although polar resins, such as PBT could also be used. A male mold member was placed in contact with the female mold member to form a contact lens mold assembly comprising a contact lens shaped cavity containing the polymerizable composition. In the following Examples, the molding surface of the male mold member was formed of a non-polar resin, specifically polypropylene.

Contact lens mold assemblies were placed in a nitrogen flushed oven to allow the precursor compositions to thermally cure. For all of the Examples, the contact lens mold assemblies were exposed to temperatures of at least about 55° C. for about 2 hours. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable compositions, the contact lens mold assemblies were demolded to separate the male and female mold members. The polymerized contact lens body remained adhered to the male mold or the female mold. A dry demolding process where the mold assembly is not contacted with a liquid medium can be used, or a wet demolding process where the mold assembly is contacted with a liquid medium such as, for example, water or an aqueous solution, can be used. A mechanical dry demolding process can involve applying mechanical force to a portion of one or both of the mold members in order to separate the mold members. In all of the following Examples, a dry demolding process was used.

The polymerized contact lens body was then delensed from the male mold or female mold to produce a delensed polymerized contact lens body. In one example of a delensing method, the polymerized contact lens body can be delensed from the male mold member using a dry delensing process, such as by manually peeling the lens from the male mold member or by compressing the male mold member and directing a gas toward the male mold member and the polymerized contact lens body, and lifting the dry polymerized contact lens body with a vacuum device from the male mold member, which is discarded. In other methods, the polymerized contact lens body can be delensed using a wet delensing process by contacting the dry polymerized contact lens body with a liquid releasing medium, such as water or an aqueous solution. For example, a male mold member with the attached polymerized contact lens body can be dipped into a receptacle containing a liquid until the polymerized contact lens body separates from the male mold member. Or, a volume of liquid releasing medium can be added to the female mold to soak the polymerized contact lens body in the liquid and to separate the lens body from the female mold member. In the following Examples, a dry delensing process was used. Following separation, the lens body can be lifted from the mold member manually using tweezers or using a vacuum device and placed into a tray.

The delensed lens product was then washed to remove extractable materials from the polymerized contact lens body, and hydrated. Extractable materials included polymerizable components such as, for example, monomers, or cross-linkers, or any optional polymerizable ingredients such as tints or UV blockers, or combinations thereof, present in the polymerizable composition which remain present in the polymeric lens body in an unreacted form, in a partially reacted form, or in an uncross-linked form, or any combination thereof, following polymerization of the lens body and prior to extraction of the lens body. Extractable materials may have also included any non-polymerizable ingredients present in the polymerizable composition, for example, any optional non-polymerizable tinting agents, or UV blockers, or diluents, or chain transfer agent, or any combination thereof, remaining present in the polymeric lens body following polymerization of the polymeric lens body but prior to extraction of the polymeric lens body.

In another method, such as a method involving delensing by compression of the male mold member and directing gas flow toward the male mold member, the delensed polymerized contact lens bodies can be placed in cavities of lens carriers or trays where the delensed polymeric lens bodies can then be contacted with one or more volumes of an extraction liquid, such as an aqueous extraction liquid free of a volatile organic solvent, for example deionized water or an aqueous solution of a surfactant such as Tween 80.

In other methods, such as those involving wet delensing by contacting the mold and lens with a liquid releasing medium, the delensed polymerized contact lens bodies can be washed to remove extractable components from the lens bodies using a washing liquid that is free of a volatile organic solvent, such as a lower alcohol, for example, methanol, ethanol, or any combination thereof. For example, the delensed polymerized contact lens bodies can be washed to remove extractable components from the lens bodies by contacting the lens bodies with aqueous washing liquids free of a volatile organic solvent, such as, for example, deionized water, or a surfactant solution, or a saline solution, or a buffer solution, or any combination thereof. The washing can take place in the final contact lens package, or can take place a in washing tray or a washing tank.

In the following Examples, following the dry demolding and dry delensing steps, the dry delensed lens bodies were placed in cavities of trays, and the delensed polymeric lens bodies were extracted and hydrated by contacting the polymeric lens bodies with one or more volumes of extraction liquids. The extraction and hydration liquids used in the extraction and hydration process consisted of volatile organic solvent-free extraction and hydration liquids, i.e., entirely aqueous-based extraction and hydration liquids. Specifically, in the Examples below, the extraction and hydration process used comprised at least three extraction and hydration steps in separate portions of a solution of Tween 80 in deionized water, wherein the temperature of the Tween 80 solution of the portions ranged from room temperature to about 90 degrees C., and wherein each extraction and hydration step lasted from about 15 minutes to about 3 hours.

Washed, extracted and hydrated lenses were then placed individually in contact lens blister packages with a phosphate buffered saline packaging solution. The blister packages were sealed and sterilized by autoclaving.

Following sterilization, lens properties such as contact angle, including dynamic and static contact angle, oxygen permeability, ionoflux, modulus, elongation, tensile strength, water content, and the like were determined, as described herein.

For the present contact lenses, contact angles including dynamic and static contact angles, can be determined using routine methods known to persons of ordinary skill in the art. For example, the advancing contact angle and receding contact angle of the contact lenses provided herein can be measured using a conventional drop shape method, such as the sessile drop method or captive bubble method.

In the following Examples, the advancing and receding contact angle of silicone hydrogel contact lenses was determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle was be determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values of the present lenses can be determined using routine methods known to persons of ordinary skill in the art, such as, for example, a test method in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percent energy loss of the present silicone hydrogel contact lenses can be determined using routine methods known to persons of ordinary skill in the art. For the following Examples, the percent energy loss was determined using an Instron Model 3343 (Instron Corporation, Norwood, Mass., USA) mechanical testing system, with a 10N force transducer (Instron model no. 2519-101) and Bluehill Materials Testing Software including a TestProfiler module. The energy loss was determined inside a chamber having a relative humidity of least 70%. Before testing, each lens was soaked in phosphate buffered solution (PBS) for at least 10 minutes. Using tweezers, the lens was loaded into the grips of the calibrated Instron apparatus, with the lens loaded vertically between the grips as symmetrically as possible so that the lens fit over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished, energy loss was calculated using the following equation: Lost Energy (%)=(Energy to 100% strain−Energy to return to 0% strain)/Energy to 100% strain×100%.

The ionoflux of the present lenses can be determined using routine methods known to persons of ordinary skill in the art. For the lenses of the following Examples, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes. The conductivity versus time data was substantially linear, and was used to calculate the ionoflux value for the lenses tested.

The oxygen permeability (Dk) of the present lenses can be determined using routine methods known to persons of ordinary skill in the art. For example, the Dk value can be determined using the Mocon Method, as described in U.S. Pat. No. 5,817,924, which is incorporated by reference herein. The Dk values of the lenses of the following Examples were determined using a commercially available instrument under the model designation of MOCON® Ox-Tran System (Mocon Inc., Minneapolis, Minn., USA).

The equilibrium water content (EWC) of the present lenses can be determined using routine methods known to persons of ordinary skill in the art. For the lenses of the following Examples a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The percentage of the wet extractable component or dry extractable component in a lens can be determined by extracting the lenses in an organic solvent in which the polymeric lens body is not soluble in accordance with methods known to those of ordinary skill in the art. For the lenses of the following Examples, an extraction in methanol using a Sohxlet extraction process was used. For determination of the wet extractable component, a sample (e.g., at least 5 lenses per lot) of fully hydrated and sterilized contact lenses was prepared by removing excess packaging solution from each lens and drying them overnight in an 80° C. vacuum oven. For determination of the dry extractable component, a sample of polymeric lens bodies which had not been washed, extracted; hydrated or sterilized was prepared by drying the lens bodies overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractables: [(W1−W2)/W1]×100.

Example 1

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 32 |
| Si3 | 4 |
| VMA | 40 |
| EGMA | 5 |
| MMA | 12 |
| TEGDMA | 1.0 |
| TEGDVE | 0.3 |
| BVE | 7 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3. This batch of contact lenses had acceptable average dimensional stability variance.

In addition, these silicone hydrogel contact lenses had, when fully hydrated, an EWC of about 55% wt/wt, an ionoflux from about 3.1 ($\times 10^{-3}$ mm$^2$/min), a Dk of about 72 barrers, a modulus of about 0.70 MPa, an elongation of about 345%, a tensile strength of about 2.4 MPa, a water break up time greater than 20 seconds, a wet extractable component of about 3.9% wt/wt, and an energy loss of about 40% when tested at the start of the shelf life study, and had an average dimensional stability variance less than plus or minus 3.0% after storage for more than 2 weeks at 80 degrees C. When tested prior to extraction and hydration, the polymeric lens bodies had a dry extractable component of about 11% wt/wt.

Example 2

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 32 |
| Si3 | 4 |
| VMA | 50 |

-continued

| Chemical Compound (Abbrev.) | Unit parts |
|---|---|
| MMA | 14 |
| TEGDMA | 0.8 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3. This batch of contact lenses had acceptable average dimensional stability variance.

In addition, these silicone hydrogel contact lenses, when fully hydrated, had an EWC of about 58% wt/wt, an ionoflux from about 4.14 ($\times 10^{-3}$ mm$^2$/min), a modulus of about 0.77 MPa, an elongation of about 349%, a tensile strength of about 1.75 MPa, a water break up time greater than 20 seconds, a wet extractable content of about 4.42% wt/wt, and an energy loss of about 41% when tested at the start of the shelf life study, and had an average dimensional stability variance less than plus or minus 3.0% after storage for at least 2 weeks at 80 degrees C.

Example 3

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 23 |
| Si2 | 15 |
| VMA | 40 |
| MMA | 10 |
| EGMA | 5 |
| BVE | 7 |
| TEGDMA | 1.0 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 55% wt/wt, an ionoflux from about 4.19 ($\times 10^{-3}$ mm$^2$/min), a modulus of about 0.61 MPa, an elongation of about 275%, a tensile strength of about 1.51 MPa, a water break up time greater than 20 seconds, and a wet extractable component of about 4.10% wt/wt when tested at the start of the shelf life study, and had an average dimensional stability variance less than plus or minus 3.0% for more than 2 weeks at 80 degrees C.

Example 4

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 23 |
| Si2 | 15 |
| VMA | 45 |
| MMA | 10 |
| BVE | 7 |
| TEGDMA | 1.0 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 58% wt/wt, an ionoflux from about 2.75 ($\times 10^{-3}$ mm$^2$/min), a modulus of about 0.66 MPa, an elongation of about 216%, a tensile strength of about 0.87 MPa, a water break up time greater than 20 seconds, and a wet extractable component of about 4.56% wt/wt when tested at the start of the shelf life study, and had an average dimensional stability variance less than plus or minus 3.0% after storage for 6 days at 95 degrees C.

Example 5

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si2 | 10 |
| VMA | 40 |
| MMA | 12 |
| EGMA | 5 |
| BVE | 7 |
| TEGDMA | 1.2 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 56% wt/wt, an ionoflux from about 3.54 ($\times 10^{-3}$ mm$^2$/min), a modulus of about 0.57 MPa, an elongation of about 310%, a tensile strength of about 1.90 MPa, a water break up time greater than 20 seconds, a wet extractable component of about 4.74% wt/wt, and an energy loss from about 34 to 36% when tested at the start of the shelf life study, and had an average dimensional stability variance less than plus or minus 3.0% after storage for 7 days at 80 degrees C. When tested prior to extraction and hydration, the polymeric lens bodies had a dry extractable component of about 14.39% wt/wt.

Example 6

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si2 | 10 |
| VMA | 45 |
| MMA | 12 |
| EGMA | 2 |
| BVE | 5 |
| TEGDMA | 1.2 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 57% wt/wt, an ionoflux from about 3.68 ($\times 10^{-3}$ mm$^2$/min), a modulus of about 0.69 MPa, an elongation of about 314%, a tensile strength of about 1.30 MPa, a water break up time greater than 20 seconds, a wet extractable component of about 1.81% wt/wt, and an energy loss of about 34% when tested at the start of the shelf life study, and had an average dimensional stability variance less than plus or minus 3.0% after storage for 14 days at 80 degrees C.

Example 7

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si3 | 2 |
| Si2 | 10 |
| VMA | 45 |
| MMA | 12 |
| BVE | 5 |
| TEGDMA | 1.2 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from three siloxane monomers, Si1, Si2 and Si3. This batch of contact lenses had acceptable average dimensional stability variance.

In addition, these silicone hydrogel contact lenses, when fully hydrated, had an EWC of about 55% wt/wt, an ionoflux from about 3.06 ($\times 10^{-3}$ mm$^2$/min), a modulus of about 0.85 MPa, an elongation of about 284%, a tensile strength of about 1.88 MPa, a water break up time greater than 20 seconds, a wet extractable component of about 2.38% wt/wt, and an energy loss of about 36% when tested at the start of the shelf life study, and had an average dimensional stability variance less than plus or minus 3.0% after storage for 14 days at 80 degrees C.

Example 8

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si2 | 10 |
| VMA | 40 |
| MMA | 12 |
| EGMA | 5 |
| BVE | 7 |
| TEGDMA | 1.3 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 54% wt/wt, an ionoflux from about 3.57 ($\times 10^{-3}$ mm$^2$/min), a modulus of about 0.66 MPa, an elongation of about 274%, a tensile strength of about 1.40 MPa, and a wet extractable content of about 3.8% wt/wt when tested at the start of the shelf life study, and had an average dimensional stability variance less than plus or minus 3.0% after storage for 7 days at 80 degrees C.

Example 9

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si3 | 2 |
| Si2 | 10 |
| VMA | 45 |
| MMA | 12 |
| BVE | 5 |
| TEGDMA | 1.1 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from three siloxane monomers, Si1, Si2 and Si3. This batch of contact lenses had acceptable average dimensional stability variance.

In addition, these silicone hydrogel contact lenses, when fully hydrated, had a modulus of about 0.81 MPa, an elongation of about 351%, a tensile strength of about 1.61 MPa, and EWC from 30% wt/wt to 70% wt/wt when tested at the start of the shelf life study, and had an average dimensional stability variance less than plus or minus 3.0% for 14 days at 80 degrees C.

Example 10

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si3 | 2 |
| Si2 | 10 |
| VMA | 40 |
| EGMA | 15 |
| BVE | 7 |
| TEGDMA | 1.6 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an ionoflux from about 3.33 ($\times 10^{-3}$ mm$^2$/min), a modulus of about 0.74 MPa, and an elongation of about 222% when tested at the start of the shelf life study, and had an average dimensional stability variance less than plus or minus 3.0% for 14 days at 80 degrees C.

Example 11

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 32 |
| Si3 | 4 |

-continued

| Chemical Compound (Abbrev.) | Unit parts |
|---|---|
| VMA | 45 |
| MMA | 13 |
| EGMA | 3 |
| BVE | 3 |
| TEGDMA | 1.0 |
| TEGDVE | 0.2 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3. This batch of contact lenses had acceptable average dimensional stability variance.

In addition, these silicone hydrogel contact lenses, when fully hydrated, had an EWC of about 57% wt/wt, a modulus of about 0.70 MPa, an energy loss of about 40%, and a captive bubble dynamic advancing contact angle of from about 50 to about 60 degrees when tested at the start of the shelf life study, and had an average dimensional stability variance less than plus or minus 3.0% for 14 days at 80 degrees C.

Example 12

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si2 | 10 |
| VMA | 40 |
| MMA | 12 |
| EGMA | 5 |
| BVE | 7 |
| TEGDMA | 1.2 |
| TEGDVE | 0.2 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 56% wt/wt, a modulus of about 0.50 MPa, and a captive bubble dynamic advancing contact angle of from about 47 to about 51 degrees when tested at the start of the shelf life study, and had an average dimensional stability variance less than plus or minus 3.0% for 4.4 weeks at 80 degrees C.

Example 13

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 26 |
| Si2 | 10 |
| VMA | 40 |
| MMA | 12 |
| EGMA | 5 |
| BVE | 3 |
| EGDMA | 0.5 |
| TEGDVE | 0.1 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 55% wt/wt, a modulus of about 0.60 MPa, and a captive bubble dynamic advancing contact angle of from about 47 to about 55 degrees when tested at the start of the shelf life study, and had an average dimensional stability variance less than plus or minus 3.0% after storage for 2 weeks at 80 degrees C.

Example 14

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 29 |
| Si2 | 8 |
| VMA | 42 |
| MMA | 14 |
| DEGVE | 7 |
| EGDMA | 0.6 |
| TEGDVE | 0.08 |

| Chemical Compound (Abbrev.) | Unit parts |
| --- | --- |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC from about 55% wt/wt to about 56% wt/wt, a modulus of about 0.71 MPa, and a captive bubble dynamic advancing contact angle of from about 45 to about 47 degrees when tested at the start of the shelf life study, and had an average dimensional stability variance less than plus or minus 3.0% for at least 2 weeks at 80 degrees C.

Example 15

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
| --- | --- |
| Si1 | 29 |
| Si2 | 8 |
| VMA | 44 |
| MMA | 14 |
| EGVE | 5 |
| EGDMA | 0.6 |
| TEGDVE | 0.15 |
| V-64 | 0.5 |
| UV2 | 1.3 |
| RBT2 | 0.01 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 56% wt/wt, and a modulus of about 0.65 MPa when tested at the start of the shelf life study, and had an average dimensional stability variance less than plus or minus 3.0% for 2 weeks at 80 degrees C.

Example 16

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
| --- | --- |
| Si1 | 29 |
| Si2 | 8 |
| VMA | 45 |
| MMA | 13 |
| HEMA | 4 |
| EGDMA | 0.5 |
| TEGDVE | 0.1 |
| V-64 | 0.5 |
| UV2 | 1.7 |
| RBT2 | 0.01 |
| pTPP | 0.5 |
| AE | 0.3 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of from about 55% wt/wt to about 56% wt/wt, a modulus of about 0.53 MPa, a captive bubble dynamic advancing contact angle of from about 51 to about 53 degrees, and an energy loss of about 34% when tested at the start of the shelf life study, and had an average dimensional stability variance less than plus or minus 3.0% for 4.4 weeks at 80 degrees C.

Example 17

A polymerizable silicone composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
| --- | --- |
| Si1 | 29 |
| Si2 | 8 |
| VMA | 42 |
| MMA | 8 |
| EGMA | 6 |
| DEGVE | 7 |
| EGDMA | 0.6 |
| TEGDVE | 0.1 |
| V-64 | 0.5 |
| UV2 | 1.7 |
| RBT2 | 0.01 |
| pTPP | 0.5 |
| AE | 0.4 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC from 57% wt/wt to 58% wt/wt, an ionoflux of about 2.9 ($\times 10^{-3}$ mm$^2$/min), a modulus of about 0.7 MPa, an elongation of about 300%, a tensile strength of about 1.5 MPa, a captive bubble dynamic advancing contact angle of from about 44 to about 48 degrees, a wet extractable component of about 5.10% wt/wt, and an energy loss from about 32% to about 33% when tested at the start of the shelf life study, and had an average dimensional stability variance less than plus or minus 3.0% after storage for 4.4 weeks at 80 degrees C. When tested prior to extraction and hydration, the polymeric lens bodies had a dry extractable component of about 12.2% wt/wt.

Example 18

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 29 |
| Si2 | 8 |
| VMA | 45 |
| HOB | 7 |
| EGMA | 10 |
| EGDMA | 0.5 |
| TEGDVE | 0.1 |
| V-64 | 0.5 |
| UV2 | 1.7 |
| RBT2 | 0.01 |
| pTPP | 0.5 |
| AE | 0.3 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC from about 55% wt/wt to about 56% wt/wt, an ionoflux of about 4.1 ($\times 10^{-3}$ mm$^2$/min), a modulus of about 0.6 MPa, an elongation of about 275%, a tensile strength of about 1.2 MPa, a captive bubble dynamic advancing contact angle of from about 55 to about 58 degrees, a wet extractable component of about 4.6% wt/wt, an energy loss from about 31% to about 32%, and a swell factor of about 27% when tested at the start of the shelf life study, and had an average dimensional stability variance less than plus or minus 3.0% for after storage for 4.4 weeks at 80 degrees C. When tested prior to extraction and hydration, the polymeric lens bodies had a dry extractable component of about 10.6% wt/wt.

Example 19

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 30 |
| Si2 | 7 |
| VMA | 44 |
| MMA | 8 |
| EGMA | 6 |
| BVE | 4 |
| DEGVE | 10 |
| EGDMA | 0.6 |
| TEGDVE | 0.1 |
| V-64 | 0.5 |
| UV2 | 1.8 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC of about 61% wt/wt, an ionoflux of about 3.8 ($\times 10^{-3}$ mm$^2$/min), a modulus of about 0.5 MPa, an elongation of about 279%, a tensile strength of about 1.2 MPa, a captive bubble dynamic advancing contact angle of from about 45 to about 47 degrees, a wet extractable component of about 4.55% wt/wt, and an energy loss from about 30% to about 33% when tested at the start of the shelf life study, and had an average dimensional stability variance less than plus or minus 3.0% after storage for 14 days at 80 degrees C. When tested prior to extraction and hydration, the polymeric lens bodies had a dry extractable component of about 13.65% wt/wt.

Example 20

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit parts |
|---|---|
| Si1 | 30 |
| Si2 | 7 |

-continued

| Chemical Compound (Abbrev.) | Unit parts |
|---|---|
| VMA | 45 |
| MMA | 12 |
| EGMA | 5 |
| BVE | 5 |
| TEGDMA | 1.4 |
| TEGDVE | 0.2 |
| V-64 | 0.5 |
| UV2 | 1.8 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2. This batch of contact lenses had acceptable average dimensional stability variance.

In addition, these silicone hydrogel contact lenses, when fully hydrated, had an EWC from about 55% wt/wt to about 57% wt/wt, an ionoflux of about 3.6 ($\times 10^{-3}$ mm$^2$/min), a modulus of about 0.7 MPa, an elongation of about 285%, a tensile strength of about 1.3 MPa, a captive bubble dynamic advancing contact angle of from about 47 to about 53 degrees, a wet extractable component of about 4.10% wt/wt, and an energy loss from about 34% to about 35% when tested at the start of the shelf life study, and had an average dimensional stability variance less than plus or minus 3.0% after storage for 14 days at 80 degrees C. When tested prior to extraction and hydration, the polymeric lens bodies were found to have a dry extractable component of about 9.80% wt/wt.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A method of manufacturing a batch of silicone hydrogel contact lenses, comprising:
providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together;
separating the polymerized silicone hydrogel contact lens bodies from the contact lens mold assemblies to produce delensed contact lens bodies;
washing the delensed contact lens bodies with an aqueous liquid free of volatile organic solvent to produce washed contact lenses; and
sterilizing the washed contact lenses in sealed contact lens packages;
wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×;
wherein a polymerizable composition used to form the polymerized silicone hydrogel contact lens bodies comprises a siloxane monomer represented by formula (1):

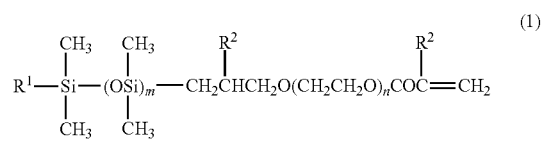

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; and wherein the polymerized silicone hydrogel contact lens bodies comprise a copolymer including polymerized units of the siloxane monomer represented by formula (1).

2. The method of claim 1, wherein at least one of the first mold section or the second mold section comprises a polar resin having a polarity from 1% to 7%.

3. The method of claim 1, wherein at least one of the first mold section or the second mold section comprises a polybutylene terephthalate (PBT) resin.

4. The method of claim 1, wherein each polymerized contact lens body is obtained by polymerizing a polymerizable composition in a contact lens mold assembly using thermal radiation, or ultraviolet radiation, or both.

5. The method of claim 1, wherein each polymerized silicone hydrogel contact lens body is obtained by polymerizing a polymerizable composition comprising a first siloxane monomer, a second siloxane monomer, at least one hydrophilic monomer, at least one hydrophobic monomer, and at least one cross-linking agent, and said polymerizable composition is free of a diluent, or free of a hydrophilic polymer, or both.

6. The method of claim 5, wherein the polymerizable composition comprises at least one hydrophilic vinyl monomer and at least one vinyl cross-linking agent.

7. The method of claim 1, wherein the batch of sterilized silicone hydrogel contact lenses has an average diameter that is at least 20% greater than the average diameter of the same batch of silicone hydrogel contact lens bodies prior to the washing step.

8. The method of claim 1, wherein each of the sterilized silicone hydrogel contact lenses has an oxygen permeability of at least 55 barrers, or an equilibrium water content from about 30% wt/wt to about 70% wt/wt, or a tensile modulus from about 0.2 MPa to about 0.9 MPa, or any combination thereof.

9. A method of manufacturing a batch of silicone hydrogel contact lenses, comprising:
providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together;
separating the polymerized silicone hydrogel contact lens bodies from the contact lens mold assemblies to produce delensed contact lens bodies;
washing the delensed contact lens bodies with an aqueous liquid free of volatile organic solvent to produce washed contact lenses; and
sterilizing the washed contact lenses in sealed contact lens packages;
wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×,
wherein a polymerizable composition used to form the polymerized silicone hydrogel contact lens bodies comprises a siloxane monomer represented by formula (2):

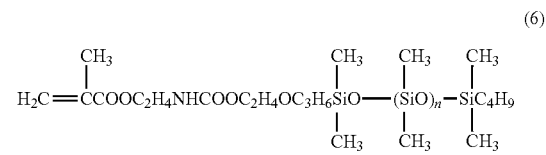

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration; and wherein the polymerized silicone hydrogel contact lens bodies comprise a copolymer including polymerized units of the siloxane monomer represented by formula (2).

10. A method of manufacturing a batch of silicone hydrogel contact lenses, comprising:
providing polymerized silicone hydrogel contact lens bodies in contact lens mold assemblies, wherein a single polymerized silicone hydrogel contact lens body is provided in a single contact lens mold assembly, and each contact lens mold assembly comprises a first mold section having a concave optical surface for forming an anterior surface of the silicone hydrogel contact lens body and a second mold section having a convex optical surface for forming a posterior surface of the silicone hydrogel contact lens body, and the first mold section and second mold section are coupled together;
separating the polymerized silicone hydrogel contact lens bodies from the contact lens mold assemblies to produce delensed contact lens bodies;
washing the delensed contact lens bodies with an aqueous liquid free of volatile organic solvent to produce washed contact lenses; and
sterilizing the washed contact lenses in sealed contact lens packages;
wherein the batch so manufactured comprises at least twenty silicone hydrogel contact lenses, and the anterior surfaces of the sterilized contact lenses have clinically acceptable surface wettabilities such that less than five percent of the silicone hydrogel contact lenses have visually identifiable non-wetting spots when located on eyes of subjects, and wherein the non-wetting spots are discontinuities of the contact lens wearer's pre-lens tear film present on the anterior surface of the contact lens, and are visually identifiable during a slit lamp examination at a total magnification from about 6× to about 70×,
wherein a polymerizable composition used to form the polymerized silicone hydrogel contact lens bodies comprises a siloxane monomer represented by formula (6):

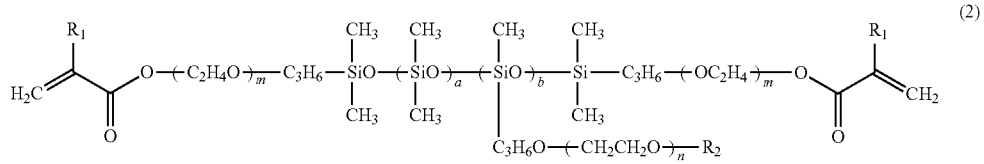

wherein n is an integer from 13-16, and the molecular weight is about 1500 daltons; and wherein the polymerized silicone hydrogel contact lens bodies comprise a copolymer including polymerized units of the siloxane monomer represented by formula (6).

11. The method of claim 1, wherein a polymerizable composition used to form the polymerized silicone hydrogel contact lens bodies comprises a hydrophilic amide monomer having one N-vinyl group, and the polymerized silicone hydrogel contact lens bodies comprise a copolymer including polymerized units of the hydrophilic amide monomer having one N-vinyl group.

12. The method of claim 1, wherein a polymerizable composition used to form the polymerized silicone hydrogel contact lens bodies comprises a vinyl-containing cross-linking agent, and the polymerized silicone hydrogel contact lens bodies comprise a copolymer including polymerized units of the vinyl-containing cross-linking agent.

13. A batch of silicone hydrogel contact lenses, the batch comprising:
   at least twenty silicone hydrogel contact lenses, each silicone hydrogel contact lens of the batch is an aqueous extracted silicone hydrogel contact lens comprising an anterior surface and an opposing posterior surface, the posterior surface dimensioned by size and shape for placement against a subject's eye;
   the anterior surface of each of the aqueous extracted contact lenses having a clinically acceptable surface wettability, such that less than five percent of the batch of silicone hydrogel contact lenses has visually identifiable non-wetting spots when located on eyes of subject;
   wherein the non-wetting spots are discontinuities of the contact lens wearer's pre-lens tear film present on the anterior surface of the contact lenses, and are visually identifiable during a slit lamp examination at a total magnification from about 6× to about 70×, and
   wherein a) a polymerizable composition used to form the silicone hydrogel contact lenses comprises a siloxane monomer represented by formula (1):

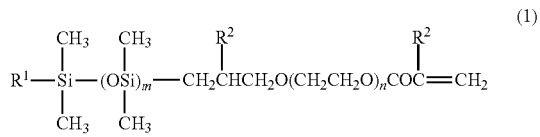

(1)

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; and wherein the silicone hydrogel contact lenses comprise a copolymer including polymerized units of the siloxane monomer represented by formula (1), or
   b) the polymerizable composition used to form the silicone hydrogel contact lenses comprises a siloxane monomer represented by formula (2):

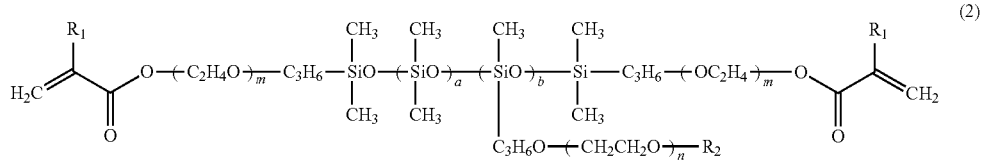

(2)

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration; and wherein the silicone hydrogel contact lenses comprise a copolymer including polymerized units of the siloxane monomer represented by formula (2), or
   c) the polymerizable composition used to form the silicone hydrogel contact lenses comprises a siloxane monomer represented by formula (6):

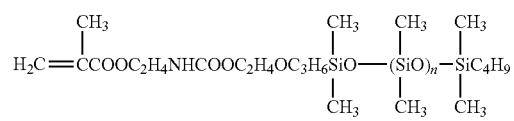

(6)

wherein n is an integer from 13-16, and the molecular weight is about 1500 daltons; and wherein the silicone hydrogel contact lenses comprise a copolymer including polymerized units of the siloxane monomer represented by formula (6).

14. The batch of silicone hydrogel contact lenses of claim 13, wherein each silicone hydrogel contact lens is a cast molded silicone hydrogel contact lens without a plasma surface treatment or a polymeric internal wetting agent provided by including a hydrophilic polymer in the polymerizable composition used to form the silicone hydrogel contact lens.

15. The batch of silicone hydrogel contact lenses of claim 13, wherein each silicone hydrogel contact lens is a cast molded silicone hydrogel contact lens obtained from a contact lens mold assembly, the contact lens mold assembly comprising an anterior mold member and a posterior mold member, each mold member being formed from a polar resin having a polarity from about 1% to about 7%.

16. The batch of silicone hydrogel contact lenses of claim 15, wherein the polar resin is polybutylene terephthalate (PBT).

17. The batch of silicone hydrogel contact lenses of claim 13, wherein each contact lens comprises a polymeric component and a liquid component, the polymeric component comprising units of at least one siloxane having one or more functional acrylic groups, and units of one or more hydrophilic monomers having one or more functional non-acrylic vinyl groups.

18. The batch of silicone hydrogel contact lenses of claim 13, wherein each contact lens has an oxygen permeability of at least 55 barrers, or an equilibrium water content from about 30% wt/wt to about 70% wt/wt, or a tensile modulus from about 0.2 MPa to about 0.9 MPa, or any combination thereof.

19. The batch of silicone hydrogel contact lenses of claim 13, wherein each silicone hydrogel is provided in a sterilized contact lens packaging solution, and each lens body has a wet extractable content less than 10% (wt/wt).

20. The method of claim 9, wherein at least one of the first mold section or the second mold section comprises a polar resin having a polarity from 1% to 7%.

21. The method of claim 9, wherein at least one of the first mold section or the second mold section comprises a polybutylene terephthalate (PBT) resin.

22. The method of claim 9, wherein each polymerized contact lens body is obtained by polymerizing a polymerizable composition in a contact lens mold assembly using thermal radiation, or ultraviolet radiation, or both.

23. The method of claim 9, wherein each polymerized silicone hydrogel contact lens body is obtained by polymerizing a polymerizable composition comprising a first siloxane monomer, a second siloxane monomer, at least one hydrophilic monomer, at least one hydrophobic monomer, and at least one cross-linking agent, and said polymerizable composition is free of a diluent, or free of a hydrophilic polymer, or both.

24. The method of claim 23, wherein the polymerizable composition comprises at least one hydrophilic vinyl monomer and at least one vinyl cross-linking agent.

25. The method of claim 9, wherein the batch of sterilized silicone hydrogel contact lenses has an average diameter that is at least 20% greater than the average diameter of the same batch of silicone hydrogel contact lens bodies prior to the washing step.

26. The method of claim 9, wherein each of the sterilized silicone hydrogel contact lenses has an oxygen permeability of at least 55 barrers, or an equilibrium water content from about 30% wt/wt to about 70% wt/wt, or a tensile modulus from about 0.2 MPa to about 0.9 MPa, or any combination thereof.

27. The method of claim 9, wherein a polymerizable composition used to form the polymerized silicone hydrogel contact lens bodies comprises a hydrophilic amide monomer having one N-vinyl group, and the polymerized silicone hydrogel contact lens bodies comprise a copolymer including polymerized units of the hydrophilic amide monomer having one N-vinyl group.

28. The method of claim 9, wherein a polymerizable composition used to form the polymerized silicone hydrogel contact lens bodies comprises a vinyl-containing cross-linking agent, and the polymerized silicone hydrogel contact lens bodies comprise a copolymer including polymerized units of the vinyl-containing cross-linking agent.

29. The method of claim 10, wherein at least one of the first mold section or the second mold section comprises a polar resin having a polarity from 1% to 7%.

30. The method of claim 10, wherein at least one of the first mold section or the second mold section comprises a polybutylene terephthalate (PBT) resin.

31. The method of claim 10, wherein each polymerized contact lens body is obtained by polymerizing a polymerizable composition in a contact lens mold assembly using thermal radiation, or ultraviolet radiation, or both.

32. The method of claim 10, wherein each polymerized silicone hydrogel contact lens body is obtained by polymerizing a polymerizable composition comprising a first siloxane monomer, a second siloxane monomer, at least one hydrophilic monomer, at least one hydrophobic monomer, and at least one cross-linking agent, and said polymerizable composition is free of a diluent, or free of a hydrophilic polymer, or both.

33. The method of claim 32, wherein the polymerizable composition comprises at least one hydrophilic vinyl monomer and at least one vinyl cross-linking agent.

34. The method of claim 10, wherein the batch of sterilized silicone hydrogel contact lenses has an average diameter that is at least 20% greater than the average diameter of the same batch of silicone hydrogel contact lens bodies prior to the washing step.

35. The method of claim 10, wherein each of the sterilized silicone hydrogel contact lenses has an oxygen permeability of at least 55 barrers, or an equilibrium water content from about 30% wt/wt to about 70% wt/wt, or a tensile modulus from about 0.2 MPa to about 0.9 MPa, or any combination thereof.

36. The method of claim 10, wherein a polymerizable composition used to form the polymerized silicone hydrogel contact lens bodies comprises a hydrophilic amide monomer having one N-vinyl group, and the polymerized silicone hydrogel contact lens bodies comprise a copolymer including polymerized units of the hydrophilic amide monomer having one N-vinyl group.

37. The method of claim 10, wherein a polymerizable composition used to form the polymerized silicone hydrogel contact lens bodies comprises a vinyl-containing cross-linking agent, and the polymerized silicone hydrogel contact lens bodies comprise a copolymer including polymerized units of the vinyl-containing cross-linking agent.

38. The batch of claim 13, wherein the polymerizable composition used to form the silicone hydrogel contact lenses comprises a siloxane monomer represented by formula (1):

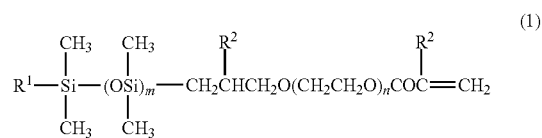

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group; and wherein the silicone hydrogel contact lenses comprise a copolymer including polymerized units of the siloxane monomer represented by formula (1).

39. The batch of claim 13, wherein the polymerizable composition used to form the silicone hydrogel contact lenses comprises a siloxane monomer represented by formula (2):

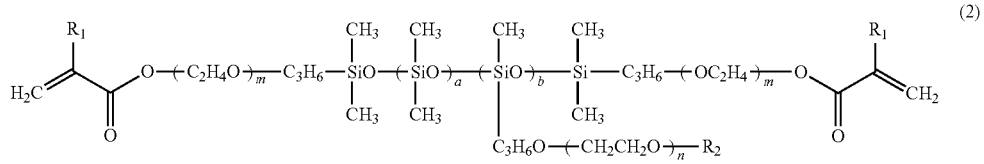

wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration; and wherein the polymerized silicone hydrogel contact lenses comprise a copolymer including units of the siloxane monomer represented by formula (2).

40. The batch of claim 13, wherein the polymerizable composition used to form the silicone hydrogel contact lenses comprises a siloxane monomer represented by formula (6):

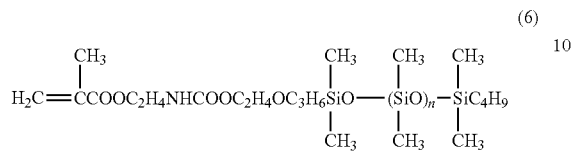

(6)

wherein n is an integer from 13-16, and the molecular weight is about 1500 daltons; and wherein the silicone hydrogel contact lenses comprise a copolymer including polymerized units of the siloxane monomer represented by formula (6).

* * * * *